(12) United States Patent
Cowburn

(10) Patent No.: US 8,103,046 B2
(45) Date of Patent: Jan. 24, 2012

(54) AUTHENTICITY VERIFICATION OF ARTICLES USING A DATABASE

(75) Inventor: Russell Paul Cowburn, Bucks (GB)

(73) Assignee: Ingenia Holdings Limited, Tortola (VG)

( * ) Notice: Subject to any disclaimer, the term of this patent is extended or adjusted under 35 U.S.C. 154(b) by 873 days.

(21) Appl. No.: 11/660,078

(22) PCT Filed: Jul. 29, 2005

(86) PCT No.: PCT/GB2005/003003
§ 371 (c)(1),
(2), (4) Date: Jul. 3, 2008

(87) PCT Pub. No.: WO2006/016114
PCT Pub. Date: Feb. 16, 2006

(65) Prior Publication Data
US 2008/0294900 A1   Nov. 27, 2008

Related U.S. Application Data

(60) Provisional application No. 60/601,500, filed on Aug. 13, 2004.

(30) Foreign Application Priority Data

Aug. 13, 2004 (GB) .................................. 0418173.1

(51) Int. Cl.
*G06K 9/00* (2006.01)
*G06K 9/36* (2006.01)
*G06F 12/00* (2006.01)

(52) U.S. Cl. ......... 382/100; 382/181; 382/280; 713/176

(58) Field of Classification Search .................. 382/280, 382/100, 141, 143, 152, 135–140, 181, 209, 382/217, 218; 713/176; 348/86, 89–92
See application file for complete search history.

(56) References Cited

U.S. PATENT DOCUMENTS
3,781,109 A   12/1973  Mayer, Jr. et al.
(Continued)

FOREIGN PATENT DOCUMENTS
CN   1588847   3/2005
(Continued)

OTHER PUBLICATIONS

International Search Report issued by UK Intellectual Property Office, Mar. 28, 2008.
(Continued)

*Primary Examiner* — Yon Couso
(74) *Attorney, Agent, or Firm* — McDonnell Boehnen Hulbert & Berghoff LLP

(57) ABSTRACT

A digital-signature is obtained by digitising a set of data points obtained by scanning a coherent beam over a paper, cardboard or other article, and measuring the scatter. A thumbnail-digital signature is also determined by digitising an amplitude spectrum of a Fourier transform of the set of data points. A database of digital signatures and their thumbnails can thus be built up. The authenticity of an article can later be verified by re-scanning the article to determine its digital signature and thumbnail, and then searching the database for a match. Searching is done on the basis of the Fourier transform thumbnail to improve search speed. Speed is improved, since, in a pseudo-random bit sequence, any bit shift only affects the phase spectrum, and not the amplitude spectrum of a Fourier transform represented in polar coordinates. The amplitude spectrum stored in the thumbnail can therefore be matched without any knowledge of the unknown bit shift caused by registry errors between the original scan and the re-scan.

21 Claims, 11 Drawing Sheets

U.S. PATENT DOCUMENTS

| | | |
|---|---|---|
| 3,877,019 A | 4/1975 | Auerbach et al. |
| 4,179,212 A | 12/1979 | Lahr |
| 4,218,674 A | 8/1980 | Brosow et al. |
| 4,423,415 A | 12/1983 | Goldman |
| 4,525,748 A | 6/1985 | Carbone |
| 4,537,504 A | 8/1985 | Baltes et al. |
| 4,544,266 A | 10/1985 | Antes |
| 4,568,936 A | 2/1986 | Goldman |
| 4,599,509 A | 7/1986 | Silverman et al. |
| 4,738,901 A | 4/1988 | Finkel et al. |
| 4,748,316 A | 5/1988 | Dickson |
| 4,785,290 A | 11/1988 | Goldman et al. |
| 4,791,669 A | 12/1988 | Kage |
| 4,797,921 A | 1/1989 | Shiraishi |
| 4,817,176 A | 3/1989 | Marshall et al. |
| 4,820,912 A | 4/1989 | Samyn |
| 4,920,385 A | 4/1990 | Clarke et al. |
| 4,929,821 A | 5/1990 | Kocznar et al. |
| 5,003,596 A | 3/1991 | Wood |
| 5,054,066 A | 10/1991 | Riek et al. |
| 5,058,164 A | 10/1991 | Elmer et al. |
| 5,059,776 A | 10/1991 | Antes |
| 5,081,675 A | 1/1992 | Kittirutsunetorn |
| 5,103,479 A | 4/1992 | Takaragi et al. |
| 5,120,126 A | 6/1992 | Wertz et al. |
| 5,133,601 A | 7/1992 | Cohen et al. |
| 5,142,578 A | 8/1992 | Matyas et al. |
| 5,194,918 A | 3/1993 | Kino et al. |
| 5,243,405 A | 9/1993 | Tichenor et al. |
| 5,258,605 A | 11/1993 | Metlitsky et al. |
| 5,306,899 A | 4/1994 | Marom et al. |
| 5,307,423 A | 4/1994 | Gupta et al. |
| 5,325,167 A | 6/1994 | Melen |
| 5,384,717 A | 1/1995 | Ebenstein |
| 5,451,759 A | 9/1995 | Hoshino et al. |
| 5,453,840 A | 9/1995 | Parker et al. |
| 5,485,312 A | 1/1996 | Horner |
| 5,488,661 A | 1/1996 | Matsui |
| 5,510,199 A | 4/1996 | Martin |
| 5,521,984 A | 5/1996 | Denenberg et al. |
| 5,539,840 A * | 7/1996 | Krtolica et al. ............... 382/195 |
| 5,546,462 A | 8/1996 | Indeck et al. |
| 5,637,854 A | 6/1997 | Thomas |
| 5,647,010 A | 7/1997 | Okubo et al. |
| 5,673,338 A | 9/1997 | Denenberg et al. |
| 5,687,002 A | 11/1997 | Itoh |
| 5,760,386 A | 6/1998 | Ward |
| 5,767,988 A | 6/1998 | Dobbs et al. |
| 5,784,463 A | 7/1998 | Chen et al. |
| 5,790,025 A | 8/1998 | Amer et al. |
| 5,886,798 A | 3/1999 | Staub et al. |
| 5,903,721 A | 5/1999 | Sixtus |
| 5,912,974 A | 6/1999 | Holloway et al. |
| 6,029,150 A | 2/2000 | Kravitz |
| 6,141,119 A | 10/2000 | Tseng et al. |
| 6,182,892 B1 | 2/2001 | Angelo et al. |
| 6,223,166 B1 | 4/2001 | Kay |
| 6,280,797 B1 | 8/2001 | Kuczynski et al. |
| 6,314,409 B2 | 11/2001 | Schneck et al. |
| 6,332,663 B1 | 12/2001 | Puzio |
| 6,360,001 B1 | 3/2002 | Berger et al. |
| 6,365,907 B1 | 4/2002 | Staub et al. |
| 6,373,573 B1 | 4/2002 | Jung |
| 6,389,151 B1 | 5/2002 | Carr et al. |
| 6,390,368 B1 | 5/2002 | Edwards |
| 6,466,329 B1 | 10/2002 | Mukai |
| 6,473,165 B1 | 10/2002 | Coombs et al. |
| 6,560,355 B2 | 5/2003 | Graves et al. |
| 6,563,129 B1 | 5/2003 | Knobel |
| 6,584,214 B1 | 6/2003 | Pappu et al. |
| 6,621,916 B1 | 9/2003 | Smith et al. |
| 6,741,360 B2 | 5/2004 | D'Agraives et al. |
| 6,760,472 B1 | 7/2004 | Takeda et al. |
| 6,779,720 B2 | 8/2004 | Lewis |
| 6,850,147 B2 | 2/2005 | Prokoski et al. |
| 6,882,738 B2 | 4/2005 | Davis et al. |
| 6,928,552 B1 | 8/2005 | Mischenko et al. |
| 6,950,094 B2 | 9/2005 | Gordon et al. |
| 6,955,141 B2 | 10/2005 | Santanam et al. |
| 6,961,449 B2 | 11/2005 | Mil'shtein |
| 6,970,573 B2 | 11/2005 | Carr et al. |
| 6,977,791 B2 | 12/2005 | Zhu et al. |
| 7,002,675 B2 | 2/2006 | Macgibbon |
| 7,071,481 B2 | 7/2006 | Nekrasov et al. |
| 7,076,084 B2 | 7/2006 | Davis et al. |
| 7,077,332 B2 | 7/2006 | Vershuur et al. |
| 7,080,041 B2 | 7/2006 | Nagel |
| 7,082,216 B2 | 7/2006 | Jones et al. |
| 7,111,321 B1 | 9/2006 | Watts, Jr. et al. |
| 7,119,662 B1 | 10/2006 | Horiguchi et al. |
| 7,143,949 B1 | 12/2006 | Hannigan |
| 7,164,810 B2 | 1/2007 | Schnee et al. |
| 7,170,391 B2 | 1/2007 | Lane et al. |
| 7,200,868 B2 | 4/2007 | Mattox et al. |
| 7,221,445 B2 | 5/2007 | Earthman et al. |
| 7,222,361 B2 | 5/2007 | Kemper |
| 7,277,183 B2 | 10/2007 | Deck |
| 7,333,629 B2 | 2/2008 | Patton et al. |
| 7,336,842 B2 * | 2/2008 | Kondo ............... 382/250 |
| 7,346,184 B1 | 3/2008 | Carr et al. |
| 7,353,994 B2 | 4/2008 | Farrall et al. |
| 7,389,530 B2 | 6/2008 | Raghunath et al. |
| 7,391,889 B2 * | 6/2008 | Kim et al. ............... 382/118 |
| 7,497,379 B2 | 3/2009 | Chen et al. |
| 7,506,365 B2 | 3/2009 | Hirano et al. |
| 7,567,349 B2 | 7/2009 | Tearney et al. |
| 7,577,844 B2 | 8/2009 | Kirovski |
| 7,599,927 B2 | 10/2009 | Lebrat |
| 7,599,963 B2 | 10/2009 | Fernandez |
| 7,602,904 B2 | 10/2009 | Juels et al. |
| 7,605,940 B2 | 10/2009 | Silverbrook et al. |
| 7,647,279 B2 | 1/2010 | Bourrieres et al. |
| 7,684,069 B2 | 3/2010 | Kashiwazaki |
| 7,716,297 B1 | 5/2010 | Wittel et al. |
| 2002/0091555 A1 | 7/2002 | Leppink |
| 2002/0111837 A1 | 8/2002 | Aupperle |
| 2002/0116329 A1 | 8/2002 | Serbetcioglu et al. |
| 2003/0002067 A1 | 1/2003 | Miyano |
| 2003/0012374 A1 | 1/2003 | Wu et al. |
| 2003/0018587 A1 | 1/2003 | Althoff et al. |
| 2003/0028494 A1 | 2/2003 | King et al. |
| 2003/0035539 A1 | 2/2003 | Thaxton |
| 2003/0118191 A1 | 6/2003 | Wang et al. |
| 2003/0178487 A1 | 9/2003 | Rogers |
| 2003/0219145 A1 | 11/2003 | Smith |
| 2003/0231806 A1 | 12/2003 | Troyanker et al. |
| 2004/0016810 A1 | 1/2004 | Hori et al. |
| 2004/0031849 A1 | 2/2004 | Hori et al. |
| 2004/0059952 A1 | 3/2004 | Newport et al. |
| 2004/0101158 A1 | 5/2004 | Butler |
| 2004/0155913 A1 | 8/2004 | Kosugi et al. |
| 2004/0199765 A1 | 10/2004 | Kohane et al. |
| 2005/0044385 A1 | 2/2005 | Holdsworth |
| 2005/0060171 A1 | 3/2005 | Molnar |
| 2005/0101841 A9 | 5/2005 | Kaylor et al. |
| 2005/0108057 A1 | 5/2005 | Cohen et al. |
| 2005/0122209 A1 | 6/2005 | Black |
| 2005/0135260 A1 | 6/2005 | Todd |
| 2005/0178841 A1 | 8/2005 | Jones et al. |
| 2005/0217969 A1 | 10/2005 | Coombs et al. |
| 2006/0022059 A1 | 2/2006 | Juds |
| 2006/0104103 A1 | 5/2006 | Colineau |
| 2006/0163504 A1 | 7/2006 | Fujimoto et al. |
| 2006/0166381 A1 | 7/2006 | Lange |
| 2006/0256959 A1 | 11/2006 | Hymes |
| 2006/0294583 A1 | 12/2006 | Cowburn et al. |
| 2007/0025619 A1 | 2/2007 | Cowburn et al. |
| 2007/0027819 A1 | 2/2007 | Cowburn |
| 2007/0028093 A1 | 2/2007 | Cowburn et al. |
| 2007/0028107 A1 | 2/2007 | Cowburn et al. |
| 2007/0028108 A1 | 2/2007 | Cowburn et al. |
| 2007/0036470 A1 | 2/2007 | Piersol et al. |
| 2007/0053005 A1 | 3/2007 | Cowburn |
| 2007/0058037 A1 * | 3/2007 | Bergeron et al. ............... 348/82 |
| 2007/0113076 A1 | 5/2007 | Cowburn et al. |
| 2007/0115497 A1 | 5/2007 | Cowburn |
| 2007/0136612 A1 | 6/2007 | Asano et al. |

| | | | | | | |
|---|---|---|---|---|---|---|
| 2007/0153078 | A1 | 7/2007 | Cowburn | JP | 2000149087 | 5/2000 |
| 2007/0162961 | A1 | 7/2007 | Tarrance et al. | JP | 2002-092682 | 3/2002 |
| 2007/0164729 | A1 | 7/2007 | Cowburn et al. | JP | 2004102562 | 4/2002 |
| 2007/0165208 | A1 | 7/2007 | Cowburn | JP | 2003-141595 | 5/2003 |
| 2007/0188793 | A1 | 8/2007 | Wakai | JP | 2003-150585 | 5/2003 |
| 2007/0192850 | A1 | 8/2007 | Cowburn | JP | 2004171109 | 6/2004 |
| 2007/0199047 | A1 | 8/2007 | Gibart et al. | JP | 2005217805 | 8/2005 |
| 2007/0271456 | A1 | 11/2007 | Ward et al. | JP | 2008523438 | 7/2010 |
| 2008/0002243 | A1 | 1/2008 | Cowburn | KR | 20050023050 | 3/2005 |
| 2008/0016358 | A1 | 1/2008 | Filreis et al. | NL | 8002604 | 12/1981 |
| 2008/0044096 | A1 | 2/2008 | Cowburn | NL | 9401796 C | 10/1994 |
| 2008/0051033 | A1 | 2/2008 | Hymes | RU | 2043201 | 9/1995 |
| 2008/0294900 | A1 | 11/2008 | Cowburn | RU | 2065819 | 8/1996 |
| 2009/0016535 | A1 | 1/2009 | Cowburn | WO | 89/00742 | 1/1989 |
| 2009/0083372 | A1 | 3/2009 | Teppler | WO | 91/11703 | 8/1991 |
| 2009/0283583 | A1 | 11/2009 | Cowburn | WO | 91/19614 | 12/1991 |
| 2009/0290906 | A1 | 11/2009 | Cowburn | WO | 93/22745 | 11/1993 |
| 2009/0303000 | A1 | 12/2009 | Cowburn | WO | 95/24691 | 9/1995 |
| 2009/0307112 | A1 | 12/2009 | Cowburn | WO | 95/34018 | 12/1995 |
| 2010/0007930 | A1 | 1/2010 | Cowburn | WO | 96/36934 | 11/1996 |
| 2010/0008590 | A1 | 1/2010 | Cowburn | WO | 97/24699 | 7/1997 |
| 2010/0141380 | A1 | 6/2010 | Pishva | WO | 99/13391 | 3/1999 |
| 2010/0158377 | A1 | 6/2010 | Cowburn | WO | 00/45344 | 8/2000 |
| 2010/0161529 | A1 | 6/2010 | Cowburn | WO | 00/46980 | 8/2000 |
| 2010/0277446 | A1 | 11/2010 | van Veenedaal | WO | 00/65541 | 11/2000 |
| | | | | WO | 01/18754 | 3/2001 |

FOREIGN PATENT DOCUMENTS

| | | |
|---|---|---|
| WO | 01/25024 | 4/2001 |
| DE | 19632269 | 2/1997 |
| WO | 01/43086 | 6/2001 |
| DE | 19612819 | 10/1997 |
| WO | 01/86574 | 11/2001 |
| DE | 10155780 | 5/2003 |
| WO | 01/86589 | 11/2001 |
| DE | 10234431 | 2/2004 |
| WO | 01/91007 | 11/2001 |
| EP | 0234105 | 9/1987 |
| WO | 02/50790 | 6/2002 |
| EP | 0278058 | 8/1988 |
| WO | 03/087991 | 10/2003 |
| EP | 0334201 | 9/1989 |
| WO | 2004/025548 | 3/2004 |
| EP | 0472192 | 2/1992 |
| WO | 2004/025549 | 3/2004 |
| EP | 0480620 | 4/1992 |
| WO | 2004/057525 | 7/2004 |
| EP | 0570162 | 11/1993 |
| WO | 2004/070667 | 8/2004 |
| EP | 0590826 | 4/1994 |
| WO | 2004/097826 | 11/2004 |
| EP | 0691632 | 1/1996 |
| WO | 2004/109479 | 12/2004 |
| EP | 1087348 | 3/2001 |
| WO | 2005/004039 | 1/2005 |
| EP | 1273461 | 1/2003 |
| WO | 2005/004797 | 1/2005 |
| EP | 1286315 | 2/2003 |
| WO | 2005/027032 | 3/2005 |
| EP | 1388797 | 2/2004 |
| WO | 2005/029447 | 3/2005 |
| EP | 1418542 | 5/2004 |
| WO | 2005/088517 | 3/2005 |
| EP | 1434161 | 6/2004 |
| WO | 2005/048256 | 5/2005 |
| EP | 1507227 | 2/2005 |
| WO | 2005/078651 | 8/2005 |
| EP | 1577812 | 9/2005 |
| WO | 2005/080088 | 9/2005 |
| EP | 1587030 | 10/2005 |
| WO | 2005/086158 | 9/2005 |
| EP | 1616711 | 12/2005 |
| WO | 2005/088533 | 9/2005 |
| EP | 1990779 | 11/2008 |
| WO | 2005/122100 | 12/2005 |
| GB | 1319928 | 3/1972 |
| WO | 2006/016112 | 2/2006 |
| GB | 1458726 | 12/1976 |
| WO | 2006/016114 | 2/2006 |
| GB | 2097979 | 11/1982 |
| WO | 2006/021083 | 3/2006 |
| GB | 2221870 | 2/1990 |
| WO | 2006/132584 | 12/2006 |
| GB | 2228821 | 9/1990 |
| WO | 2007/012815 | 2/2007 |
| GB | 2304077 | 12/1997 |
| WO | 2007/012821 | 2/2007 |
| GB | 2346110 | 1/2000 |
| WO | 2007/028799 | 3/2007 |
| GB | 2346111 | 1/2000 |
| WO | 2007/072048 | 6/2007 |
| GB | 2411954 | 9/2005 |
| WO | 2007/080375 | 7/2007 |
| GB | 2417074 | 2/2006 |
| WO | 2007/111548 | 10/2007 |
| GB | 2417592 | 3/2006 |
| WO | 2007/144598 | 12/2007 |
| GB | 2417707 | 3/2006 |
| WO | 2009/141576 | 11/2009 |
| GB | 2426100 | 11/2006 |
| WO | 2010/004281 | 1/2010 |
| GB | 2428846 | 2/2007 |
| WO | 2010/004282 | 1/2010 |
| GB | 2428948 | 2/2007 |
| GB | 2429092 | 2/2007 |
| GB | 2429097 | 2/2007 |
| GB | 2431759 | 5/2007 |
| GB | 2433632 | 6/2007 |
| GB | 2434642 | 8/2007 |
| JP | H02-10482 | 1/1990 |
| JP | H03-192523 | 8/1991 |
| JP | H06-301840 | 10/1994 |
| JP | 07210721 | 8/1995 |
| JP | H08-003548 | 1/1996 |
| JP | H08-180189 | 7/1996 |
| JP | 09218910 | 8/1997 |
| JP | H11-224319 | 8/1999 |
| JP | 2000140987 | 5/2000 |

OTHER PUBLICATIONS

Chen, Yuqun et al., "Certifying Authenticity via Fiber-Infused Paper," ACM SIG ecom Exchanges, 5(3):29-37 (2005).

Kirovski, Darko, "Toward an Automated Verification of Certificates of Authenticity," pp. 160-169 (2004).

Smalley, Eric, "Plastic Tag makes foolproof ID," Technology Research News, Oct. 2, 2002.

G.J. Simmons, A survey of information authentication, In <i>Contemporary Cryptology, The Science of Information Integrity</i>, pp. 379-419 IEEE Press (1992).

International Search Report from International App. No. PCT/GB2005/000922 filed Mar. 9, 2005.

Buchanan, James, "Fingerprinting Documents and Packaging," Nature, 436:475 (2005).

International Search Report for Great Britain Patent App. No. GB0607867.0 (Aug. 2006).

Haist et al., "Optical detection of random features for high security applications," Optics Communications, 147:173-179 (1998).

Written Opinion for PCT/GB2007/000015 dated May 4, 2007.

International Search Report for PCT/GB2009/001702 dated Oct. 23, 2009.

UK Search Report for GB0812772.2 dated Nov. 6, 2008.

UK Search Report for GB0812773 dated Mar. 2009.

UK Search Report for GB0812773 dated Nov. 2008.

International Search Report for PCT/GB2007/002173 dated Sep. 19, 2007.

Huss G. et al., "Spatial filtering efficiency of single-mode optical fibers for stellar interferometry applications: phenomenological and numerical study," Optics Communications, North-Holland Publishing Co., Amsterdam, NL, 244:209-217 (Sep. 23, 2004).

Kvasnik et al., "Image recognition using surface scattered light in a coherent optical processor," Image Processing and its Applications, University of Manchester Institute of Science and Technology UK, pp. 361-364 (1992).

Ravikanth P S: "Physical One-way Functions," Thesis at the Massachusetts Institute of Technology, p. 1-154, Mar. 2001.

Zhang D et al., "Shape-based image retrieval using generic Fourier descriptor," Signal Processing. Image Communication, Ellsevier Science Publishers, Amsterdam, NL 17(10):825-848 (Nov. 2002).

Derrode S et al., "Robust and Efficient Fourier-Mellin Transform Approximations for Gray-Level Image Reconstruction and Complete Invariant Description," Computer Vision and Image Understanding, Academic Press, San Diego, CA, 83(1):57-78 (Jul. 2001).

Anderson, R., "Security Engineering: a guide to building dependable distributed systems," Wiley, 251-253, 2001.

Kravolec, "Plastic tag makes foolproof ID," Technology Research News, Oct. 2, 2002.

Pappu et al., "Physical one-way functions," Science, American Association for the Advancement of Science, vol. 297, No. 5589, pp. 2026-2030 (2002).

Cowburn, Russell, "Nanotechnology-Security and Brand Protection Applications 01," Smart Brand and Product Protection Conference 2005, Apr. 8, 2005 to Apr. 9, 2005, pp. 1-4, London, UK.

Van Renesse R.L., "Optical inspection techniques for security instrumentation," Proceedings of SPIE—The International Society for Optical Engineering, Vo. 2659, pp. 159-167 (Mar. 1996).

Anonymous, "Discs and paper get biometric identifiers," IEEE Review, vol. 50, No. 12, p. 23, (Dec. 2004).

Wilkes, Sally, "Fighting Fraud: Document Biometrics," Materials World, vol. 12, No. 12, pp. 29-30 (Dec. 2004).

Smith et al., "Microstructure Based Indicia," Laboratories Escher Group, pp. 1-5 (1999).

Schneier B., "Applied Cryptography. Protocols, Algorithms, and Source Code in C, Passage," Applied Cryptography, 2nd Ed., John Wiley & Sons, Inc., New York, p. 197 (1996).

El-Khamy S. E. et al., "The FBG stream cipher," Proceedings of the 24th Radio National Science Conference (NRSC 2007) IEEE Cairo, Egypt, pp. 1-8 (Mar. 2007).

Hao F. et al., "Combining crypto with biometrics effectively," IEEE Transactions on Computers IEEE USA, 55 (9):1081-1088 (Sep. 2006).

International Search Report for Great Britain Patent Application No. GB0711461.4 dated Sep. 21, 2007.

International Search Report and Written Opinion for PCT/GB2008/002020 dated Jun. 16, 2009.

d'Agraives et al., "Surface Topography, A Remarkable Method for the Identification of Seals of Structures in General," Commission of the European Communities Joint Research Centre—Ispra Establishment I-21020 Ispra (Va), Italy, pp. 403-409 (1981).

Zwick/Roell—Zwick Materials testing—the new direction in extension measurement—optiXtens (2003).

* cited by examiner

US 8,103,046 B2

AUTHENTICITY VERIFICATION OF ARTICLES USING A DATABASE

This application is a National Stage of International Application No. PCT/GB2005/003003, filed Jul. 29, 2005, which claims priority to Great Britain Patent Application No. 0418173.1, filed Aug. 13, 2004 and U.S. Provisional Application No. 60/601,500 filed Aug. 13, 2004.

BACKGROUND OF THE INVENTION

The invention relates to verification of the authenticity of an article such as a personal identification (ID) card, vendable product, original document or other item.

Many traditional authentication security systems rely on a process which is difficult for anybody other than the manufacturer to perform, where the difficulty may be imposed by expense of capital equipment, complexity of technical know-how or preferably both. Examples are the provision of a watermark in bank notes and a hologram on credit cards or passports. Unfortunately, criminals are becoming more sophisticated and can reproduce virtually anything that original manufacturers can do.

Because of this, there is a known approach to authentication security systems which relies on creating security tokens using some process governed by laws of nature which results in each token being unique, and more importantly having a unique characteristic that is measurable and can thus be used as a basis for subsequent verification. According to this approach tokens are manufactured and measured in a set way to obtain a unique characteristic. The characteristic can then be stored in a computer database, or otherwise retained. Tokens of this type can be embedded in the carrier article, e.g. a banknote, passport, ID card, important document. Subsequently, the carrier article can be measured again and the measured characteristic compared with the characteristics stored in the database to establish if there is a match.

Within this general approach it has been proposed to use different physical effects. One physical effect that has been considered in a number of prior art documents [1-4] is to use laser speckle from intrinsic properties of an article, typically in the form of a special token, to provide a unique characteristic. According to these techniques a large area, such as the whole of a special token, is illuminated with a collimated laser beam and a significant solid angle portion of the resultant speckle pattern is imaged with a CCD, thereby obtaining a speckle pattern image of the illuminated area made up of a large array of data points.

More recently a further laser speckle based technique has been developed [5] in which the unique characteristic is obtained by scanning a focused laser beam over the article and collecting many data points, typically 500 or more, from light scattered from many different parts of the article to collect a large number of independent data points. By collecting a large number of independent signal contributions specific to many different parts of the article, a digital signature can be computed that is unique to the area of the article that has been scanned. This technique is capable of providing a unique signature from the surfaces of a wide variety of articles, including untreated paper, cardboard and plastic.

An important application of this technique is security verification from a database of stored signatures, referred to as the "master database" in the following. For example, in a perfumery factory, each perfume bottle box can be scanned by a reader to obtain a signature, and these signatures are entered into a master database. The master database includes a signature from every article, i.e. box of perfume, produced. Later, for field verification, a reader can be used to scan any box of perfume to obtain a signature, and this signature is compared with the master database to establish whether there is a matching signature held in the master database. If there is no match, the article is considered to be counterfeit. If there is a match, then the article is considered to be genuine.

In many applications, for example those relating to national security, civil documentation or high volume branded goods, the number of signatures stored in the master database may be very large. The number of entries may be perhaps millions, tens of millions or even hundreds of millions. For example, this would be the case if the scheme is used for passport or driving licence verification for a populous country.

For most if not all applications, it is necessary that the search of the master database can be carried out in a reasonable time. What is reasonable will vary from application to application, but for many applications a maximum reasonable time will only be a few seconds. However, for large master databases, there are two difficulties in achieving a high speed search for a signature match.

Firstly, the scan even from a genuine item will never match its stored database scan perfectly. The test of a match or non-match is one of degree of similarity between the originally scanned signature held in the master database and the re-scanned signature. We find that a typical good quality match has approximately 75% of the bits in agreement, compared to an average of 50% agreement for a fraudulent match. Consequently, standard relational database fast searching methods such as look-up tables cannot be used efficiently. It is therefore necessary to try every entry in the database against the target signature.

Secondly, there may be an unknown bit-shift between the successful database entry and the rescanned signature. This is because the scanned object may not be in precisely the same position for the second scan as it was for the first scan. Any offsets in a direction parallel to the laser scan direction will result in a shifting of the bit pattern. It is therefore not only necessary to try every entry in the database against the target signature, but this must be done assuming a number of different lengths of bit-shifts for each database entry, which may be up to 30 or more, making the total search time potentially very long. The number of bit shifts is a function of the positioning accuracy of the readers and the per bit scan length.

SUMMARY OF THE INVENTION

This invention proposes a method of improving the search speed for databases containing very large numbers of digital signature records, thereby overcoming the second difficulty described above. The method involves storing not only a digitised representation of the scanned signature in the database, but also a digitised representation of a part of the Fourier transform of the scanned signature. When an article is rescanned, the scan data from the re-scan is Fourier transformed. The transform is then expressed in polar co-ordinates, i.e. amplitude and phase (as opposed to expressing the Fourier transform in real and imaginary components). The amplitude information is used for searching, but not the phase information which can be discarded. Namely, the database is searched for a match between the Fourier transform amplitude spectrum of the new scan and the Fourier transform amplitude spectrum stored as a thumbnail in each database record. If there is a matching database record for the article, a match between thumbnails should be found regardless of any bit shift between the new scan and the database scan. Specifically, there is no need to repeat the match for different assumed bit shifts as would otherwise be necessary to take account of an unknown bit shift between the original scan and the rescan caused by the article inevitably have a different relative position on the reader when it is re-scanned.

The search is therefore speeded up by a factor of approximately equal to the maximum assumed repositioning error between the original scan and the re-scan for verification divided by the scan length per datum (1/n), as compared with the simple method of comparing full signatures, i.e. comparing signatures in real space (as opposed to frequency space). This factor will typically be in the range 10-50, depending on the relevant parameter values. The increased search speed is at the expense of increasing the database size slightly by needing to store the amplitude spectrum of the Fourier Transform of each record as a thumbnail.

This search method works for the following reasons. A pseudo-random bit sequence, when Fourier transformed, carries some of the information in the amplitude spectrum and some in the phase spectrum. Any bit shift only affects the phase spectrum, however, and not the amplitude spectrum. Amplitude spectra can therefore be matched without any knowledge of the bit shift. Although some information is lost in discarding the phase spectrum, enough remains in order to obtain a rough match against the database. This allows one or more putative (i.e. candidate) matches to the target to be located in the database. Each of these putative matches can then be compared properly using the conventional real-space method against the new scan.

According to one aspect of the invention, there is provided a method of scanning an article arranged in a reading volume, comprising: collecting a set of data points from intensity signals obtained when coherent light scatters from the reading volume, wherein different ones of the data points relate to scatter from different parts of the reading volume; determining a digital signature of the article by digitising the set of data points; and determining a thumbnail digital signature of the article by digitising an amplitude part of a Fourier transform of the set of data points.

The scan can be performed in order to obtain and store a digital signature for the article, e.g. at the point of manufacture of an article or at the point of document creation. In this case, the digital signature is stored with its thumbnail digital signature in a database. To avoid duplicate entries, the digital signature is preferably stored with its thumbnail digital signature in the database conditional on there being no match between it and any digital signature already stored in the database. The article may additionally be labelled with a machine-readable marking, such as a barcode, that encodes an approximate record locator to assist finding the digital signature in the database.

The scan can also be performed at a later time for article verification. In this case, the verification method will further comprise: providing a database of previously recorded signatures and their thumbnail digital signatures; searching the database to seek at least one candidate match by performing a comparison between the determined thumbnail digital signature and the previously recorded thumbnail digital signatures; and determining for any candidate match whether there is a match by performing a comparison between the determined digital signature and the at least one previously recorded digital signatures. For each match a confidence level may additionally be determined based on degree of similarity between the determined digital signature and the previously recorded digital signature found to have a match. This can be useful to present to the user. If an approximate record locator marking is provided on the article, the verification method will include reading the machine-readable marking on the article to obtain the approximate record locator, and using the approximate record locator to seek the at least one candidate match in the database.

According to another aspect of the invention there is provided an apparatus for scanning an article arranged in a reading volume, comprising: a source for generating a coherent beam; a detector arrangement for collecting a set of data points from signals obtained when the coherent beam scatters from the reading volume, wherein different ones of the data points relate to scatter from different parts of the reading volume; and a data acquisition and processing module operable to: (i) determine a digital signature of the article by digitising the set of data points; and (ii) determine a thumbnail digital signature of the article by digitising an amplitude part of a Fourier transform of the set of data points.

In apparatuses for populating the database, e.g. apparatuses used by a brand owner, or government authorities, the data acquisition and processing module is further operable to store the digital signature with its thumbnail digital signature in a database. To avoid duplicate entries, this may be conditional on there being no match between it and any digital signature already stored in the database.

In apparatuses for verifying the authenticity of articles, e.g. field-use readers, the apparatus will further comprise: a database of previously recorded signatures and their thumbnail digital signatures; and a search tool operable to (i) search the database to seek at least one candidate match by performing a comparison between the determined thumbnail digital signature and the previously recorded thumbnail digital signatures; and (ii) determine for any candidate match whether there is a match by performing a comparison between the determined digital signature and the at least one previously recorded digital signatures. The search tool may be further operable to determine for each match a confidence level based on degree of similarity between the determined digital signature and the previously recorded digital signature found to have a match.

According to a further aspect of the invention there is provided a database, typically resident on a carrier medium such as a server or other system, comprising a plurality of records, each comprising: a digital signature of an article obtained by digitising a set of data points obtained from the article; and a thumbnail digital signature of the article obtained by digitising an amplitude part of a Fourier transform of the set of data points. In embodiments of the invention described below, these data points are obtained from scattering of coherent light from the article, wherein different ones of the data points relate to scatter from different parts of the article.

A still further aspect of the invention provides a system comprising a search tool operable to: search the above-described database for candidate matches by performing a comparison between an input thumbnail digital signature and the thumbnail digital signatures held in the database. The search tool is preferably further operable to determine for any candidate match whether there is a match by performing a comparison between the input digital signature and the digital signature held in the record of the candidate match. Especially for large databases, the search tool may be operable to search the database for candidate matches using an approximate record locator.

It will be understood that the database is remote from the system or integral with the system, or indeed distributed.

The database may be part of a mass storage device that forms part of the reader apparatus, or may be at a remote location and accessed by the reader through a telecommunications link. The telecommunications link may take any conventional form, including wireless and fixed links, and may be available over the internet. The data acquisition and processing module may be operable, at least in some operational modes, to allow the signature to be added to the database if no match is found. This facility will usually only be allowed to authorised persons for obvious reasons.

When using a database, in addition to storing the signature it may also be useful to associate that signature in the database with other information about the article such as a scanned copy of the document, a photograph of a passport holder, details on the place and time of manufacture of the product, or details on the intended sales destination of vendable goods (e.g. to track grey importation).

Reader apparatuses as described above may be used in order to populate a database with signatures by reading a succession of articles, e.g. in a production line, and/or in order subsequently to verify authenticity of an article, e.g. in field use.

The invention allows identification of articles made of a variety of different kinds of materials, such as paper, cardboard and plastic.

The invention allows it to be ascertained whether an article has been tampered with. This is possible if adhesively bonded transparent films, such as adhesive tape, cover the scanned area used to create the signature. If the tape must be removed to tamper with the article, e.g. to open a packaging box, the adhesive bonding can be selected so that it will inevitably modify the underlying surface. Consequently, even if similar tape is used to reseal the box, this will be detectable.

The invention provides a method of identifying an article made of paper or cardboard, comprising: exposing the paper or cardboard to coherent radiation; collecting a set of data points that measure scatter of the coherent radiation from intrinsic structure of the paper or cardboard; determining a digital signature of the article by digitising the set of data points; and determining a thumbnail digital signature of the article by digitising an amplitude part of a Fourier transform of the set of data points.

By intrinsic structure we mean structure that the article inherently will have by virtue of its manufacture, thereby distinguishing over structure specifically provided for security purposes, such as structure given by tokens or artificial fibres incorporated in the article.

By paper or cardboard we mean any article made from wood pulp process. The paper or cardboard may be treated with coatings or impregnations or covered with transparent material, such as cellophane. If long-term stability of the surface is a particular concern, the paper may be treated with an acrylic spray-on transparent coating, for example.

Data points can thus be collected as a function of position of illumination by the coherent beam. This can be achieved either by scanning a localised coherent beam over the article, or by using directional detectors to collect scattered light from different parts of the article, or by a combination of both.

The invention is considered to be particularly useful for paper or cardboard articles from the following list of examples:
1. valuable documents such as share certificates, bills of lading, passports, intergovernmental treaties, statutes, driving licenses, vehicle roadworthiness certificates, any certificate of authenticity
2. any document for tracing or tracking purposes, e.g. envelopes for mail systems, banknotes for law enforcement tracking
3. packaging of vendable products
4. brand labels on designer goods, such as fashion items
5. packaging of cosmetics, pharmaceuticals, or other products.

The invention also provides a method of identifying an article made of plastic, comprising: exposing the plastic to coherent radiation; collecting a set of data points that measure scatter of the coherent radiation from intrinsic structure of the plastic; and determining a digital signature of the article by digitising the set of data points; and determining a thumbnail digital signature of the article by digitising an amplitude part of a Fourier transform of the set of data points.

If the plastic is opaque to the coherent radiation, the scatter will be from intrinsic surface structure of the plastic, whereas if the plastic is transparent, the scatter may arise from any part of the article impinged upon by the coherent radiation.

The invention is considered to be particularly useful for plastic articles from the following list of examples:
1. plastic packaging, for example of pharmaceuticals
2. ID cards, including bank cards, staff ID cards, store cards—including the signed strip on an ID card, especially a bank or store card Particularly useful applications may be scanning over the signed strip of an ID card, i.e. after signing, so that digital signature used for authenticity is specific to the signed card and is formed from a combination of the person's signature and the surface structure of the underlying strip.

In the case of an ID article bearing a photograph of a person (which may be a plastic ID card or a pass from other material such as a paper passport) it may be useful for the reader to scan over the photograph part of the ID card (separate from scanning the cover or a blank page) as a test that no tampering has occurred. This is because, if a coating or adhesive film is used to attach a photograph to the ID article, it must be removed by a forger in order to fix a fake photograph into the ID article. This type of forgery would be identified by a reader implementing the present invention, since the new photograph would have a different surface structure.

It is expected that any other material type will be identifiable by the invention provided that it has suitable surface structure. Material types that have very smooth surfaces at a microscopic level may be unsuitable as may be opaque materials that have a very deep and/or unstable surface (e.g. fleece material).

The invention also allows identification of articles of a variety of different types, including packaging, documents, and clothing.

The invention provides a method of identifying a product by its packaging, comprising: exposing the packaging of the product to coherent radiation; collecting a set of data points that measure scatter of the coherent radiation from intrinsic structure of the packaging; and determining a digital signature of the article by digitising the set of data points; and determining a thumbnail digital signature of the article by digitising an amplitude part of a Fourier transform of the set of data points.

The relevant part of the packaging exposed to the coherent radiation may be made of paper, cardboard, plastic (e.g. cellophane shrink wrap), metal or other material with suitable intrinsic surface or internal structure. The article may be contained in the packaging, and optionally the packaging may be sealed in a tamper-proof manner. Alternatively, the packaging may be an appendage to the article, such as a tag secured with a connector that cannot be released without being visibly damaged. This may be especially useful for pharmaceutical products, cosmetic goods and perfume, and spare parts for aircraft or land or water vehicles, for example.

The invention provides a method of identifying a document, comprising: exposing the document to coherent radiation; collecting a set of data points that measure scatter of the coherent radiation from intrinsic structure of the document; and determining a digital signature of the article by digitising the set of data points; and determining a thumbnail digital signature of the article by digitising an amplitude part of a Fourier transform of the set of data points.

The invention also provides a method of identifying an item of clothing or footwear by a tag secured thereto, comprising: exposing the tag to coherent radiation; collecting a set of data points that measure scatter of the coherent radiation from intrinsic structure of the tag; and determining a digital signature of the article by digitising the set of data points; and determining a thumbnail digital signature of the article by digitising an amplitude part of a Fourier transform of the set of data points. The tag may be the normal unmodified brand tag, e.g. plastic, cardboard, attached to the clothing or footwear.

In summary, the signature can in some cases be obtained from something ancillary to a vendable product, such as its packaging, and in other cases obtained from the object itself, such as from surface structure of a document, or a vendable product. The invention may find many practical applications, for example to control grey market importation or counterfeiting. For such applications, portable readers could be used by customs officers or trading standards officers.

The signature is envisaged to be a digital signature in most applications. Typical sizes of the digital signature with current technology would be in the range 200 bits to 8 k bits, where currently it is preferable to have a digital signature size of about 2 k bits for high security.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
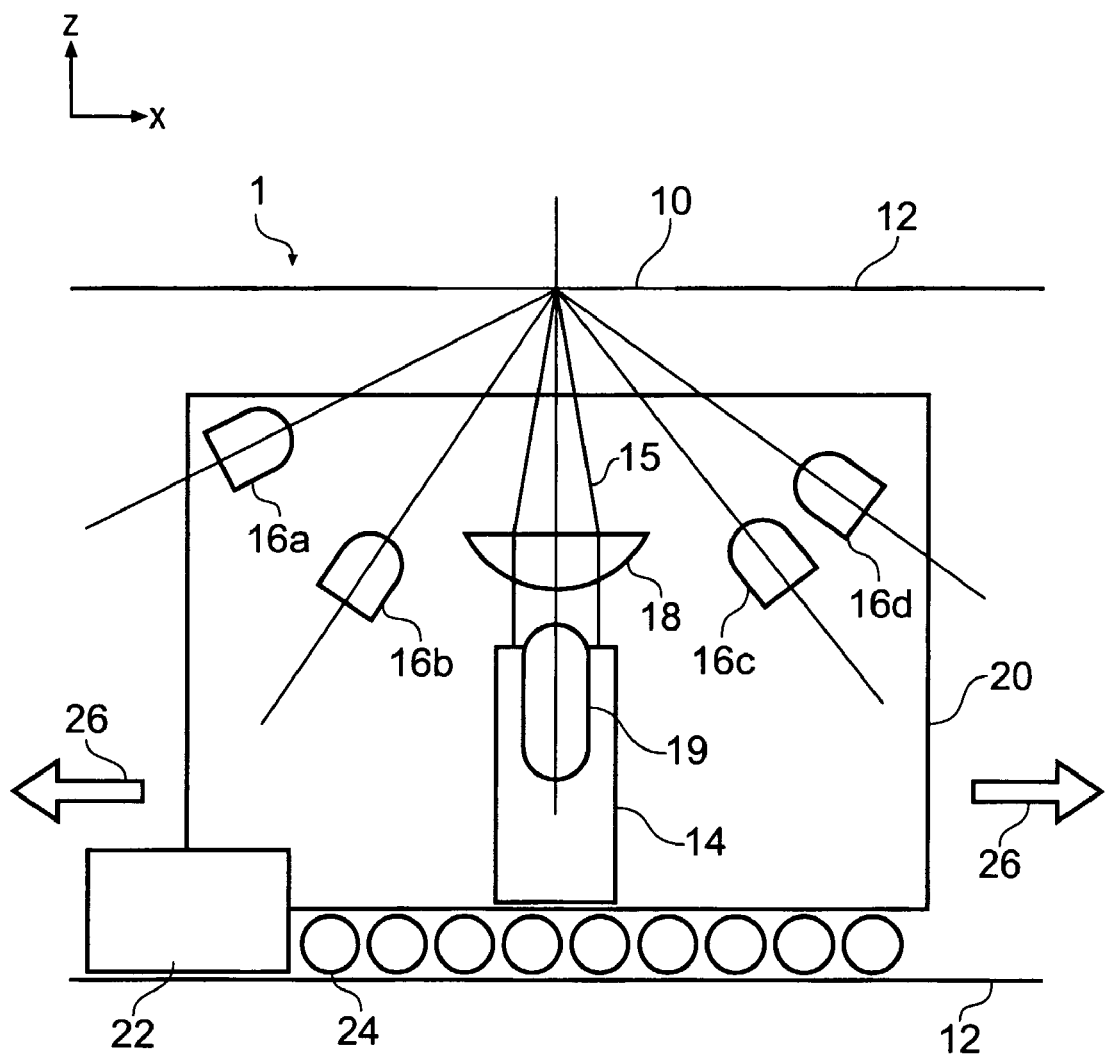
FIG. 1 is a schematic side view of a reader apparatus embodying the invention.

FIG. 1 is a schematic side view of a reader apparatus 1 embodying the invention. The optical reader apparatus 1 is for measuring a signature from an article (not shown) arranged in a reading volume of the apparatus. The reading volume is formed by a reading aperture 10 which is a slit in a housing 12. The housing 12 contains the main optical components of the apparatus. The slit has its major extent in the x direction (see inset axes in the drawing). The principal optical components are a laser source 14 for generating a coherent laser beam 15 and a detector arrangement 16 made up of a plurality of k photodetector elements, where k=4 in this example, labelled 16a, 16b, 16c and 16d. The laser beam 15 is focused by a cylindrical lens 18 into an elongate focus extending in the y direction (perpendicular to the plane of the drawing) and lying in the plane of the reading aperture. In an example prototype reader, the elongate focus has a major axis dimension of about 2 mm and a minor axis dimension of about 40 micrometres. These optical components are contained in a subassembly 20. In the illustrated embodiment, the four detector elements 16a . . . d are distributed either side of the beam axis offset at different angles in an interdigitated arrangement from the beam axis to collect light scattered in reflection from an article present in the reading volume. In an example prototype, the offset angles are −70, −20, +30 and +50 degrees. The angles either side of the beam axis are chosen so as not to be equal so that the data points they collect are as independent as possible. All four detector elements are arranged in a common plane. The photodetector elements 16a . . . d detect light scattered from an article placed on the housing when the coherent beam scatters from the reading volume. As illustrated, the source is mounted to direct the laser beam 15 with its beam axis in the z direction, so that it will strike an article in the reading aperture at normal incidence.

Generally it is desirable that the depth of focus is large, so that any differences in the article positioning in the z direction do not result in significant changes in the size of the beam in the plane of the reading aperture. In an example prototype, the depth of focus is approximately 0.5 mm which is sufficiently large to produce good results.

The parameters, of depth of focus, numerical aperture and working distance are interdependent, resulting in a well known trade off between spot size and depth of focus.

A drive motor 22 is arranged in the housing 12 for providing linear motion of the optics subassembly 20 via suitable bearings 24 or other means, as indicated by the arrows 26. The drive motor 22 thus serves to move the coherent beam linearly in the x direction over the reading aperture 10 so that the beam 15 is scanned in a direction transverse to the major axis of the elongate focus. Since the coherent beam 15 is dimensioned at its focus to have a cross-section in the xz plane (plane of the drawing) that is much smaller than a projection of the reading volume in a plane normal to the coherent beam, i.e. in the plane of the housing wall in which the reading aperture is set, a scan of the drive motor 22 will cause the coherent beam 15 to sample many different parts of the reading volume under action of the drive motor 22.

Figure 2:
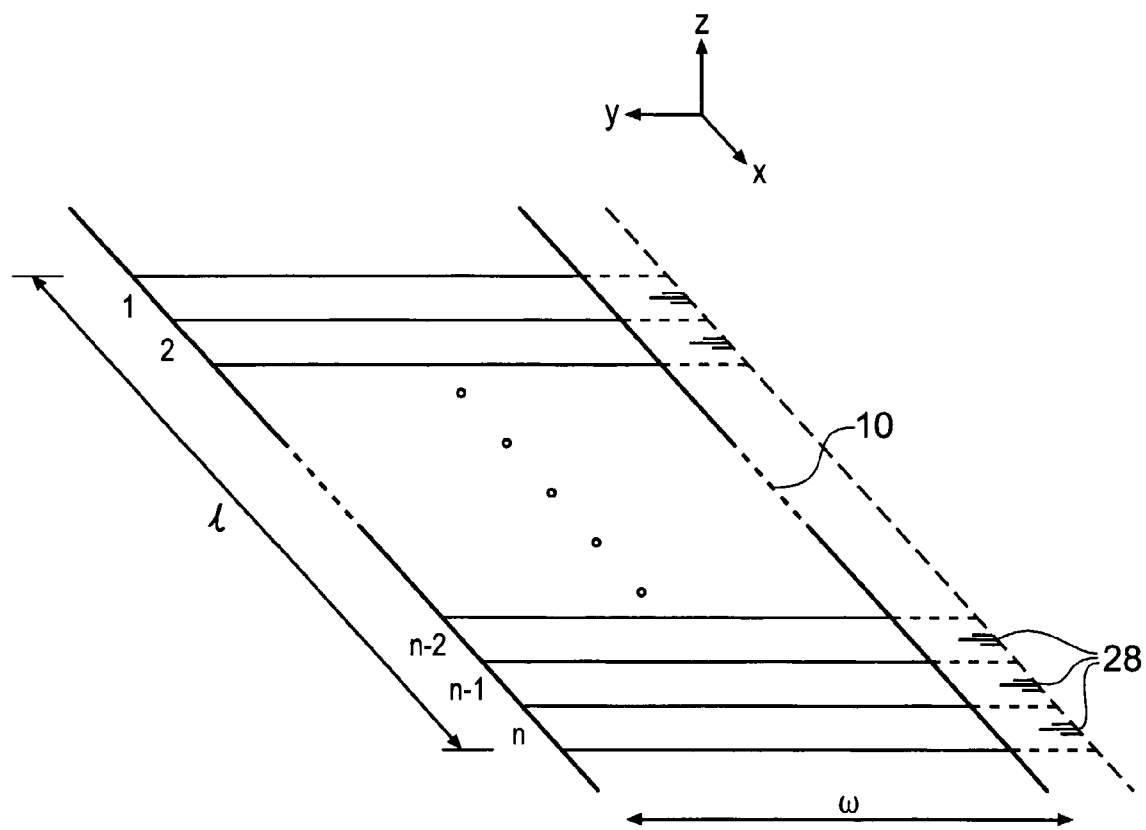
FIG. 2 is a schematic perspective view showing how the reading volume of the reader apparatus is sampled n times by scanning an elongate beam across it.

FIG. 2 is included to illustrate this sampling and is a schematic perspective view showing how the reading area is sampled n times by scanning an elongate beam across it. The sampling positions of the focused laser beam as it is scanned along the reading aperture under action of the drive is represented by the adjacent rectangles numbered 1 to n which sample an area of length 'l' and width 'w'. Data collection is made so as to collect signal at each of the n positions as the drive is scanned along the slit. Consequently, a sequence of k×n data points are collected that relate to scatter from the n different illustrated parts of the reading volume. Also illustrated schematically are distance marks 28 formed on the underside of the housing 12 adjacent the slit 10 along the x direction, i.e. the scan direction. An example spacing between the marks in the x-direction is 300 micrometres.

These marks are sampled by a tail of the elongate focus and provide for linearisation of the data in the x direction, as is described in more detail further below. The measurement is performed by an additional phototransistor 19 which is a directional detector arranged to collect light from the area of the marks 28 adjacent the slit.

In an alternative embodiment, the marks 28 are read by a dedicated encoder emitter/detector module 19 that is part of the optics subassembly 20. Encoder emitter/detector modules are used in barcode readers. For example, we have used an Agilent REDS-1500 module that is based on a focused light emitting diode (LED) and photodetector. The module signal is fed into the PIC ADC as an extra detector channel.

With an example minor dimension of the focus of 40 micrometers, and a scan length in the x direction of 2 cm, n=500, giving 2000 data points with k=4. A typical range of values for k×n depending on desired security level, article type, number of detector channels 'k' and other factors is expected to be 100<k×n<10,000. It has also been found that increasing the number of detectors k also improves the insensitivity of the measurements to surface degradation of the article through handling, printing etc. In practice, with the prototypes used to date, a rule of thumb is that the total number of independent data points, i.e. k×n, should be 500 or more to give an acceptably high security level with a wide variety of surfaces.

Figure 3:
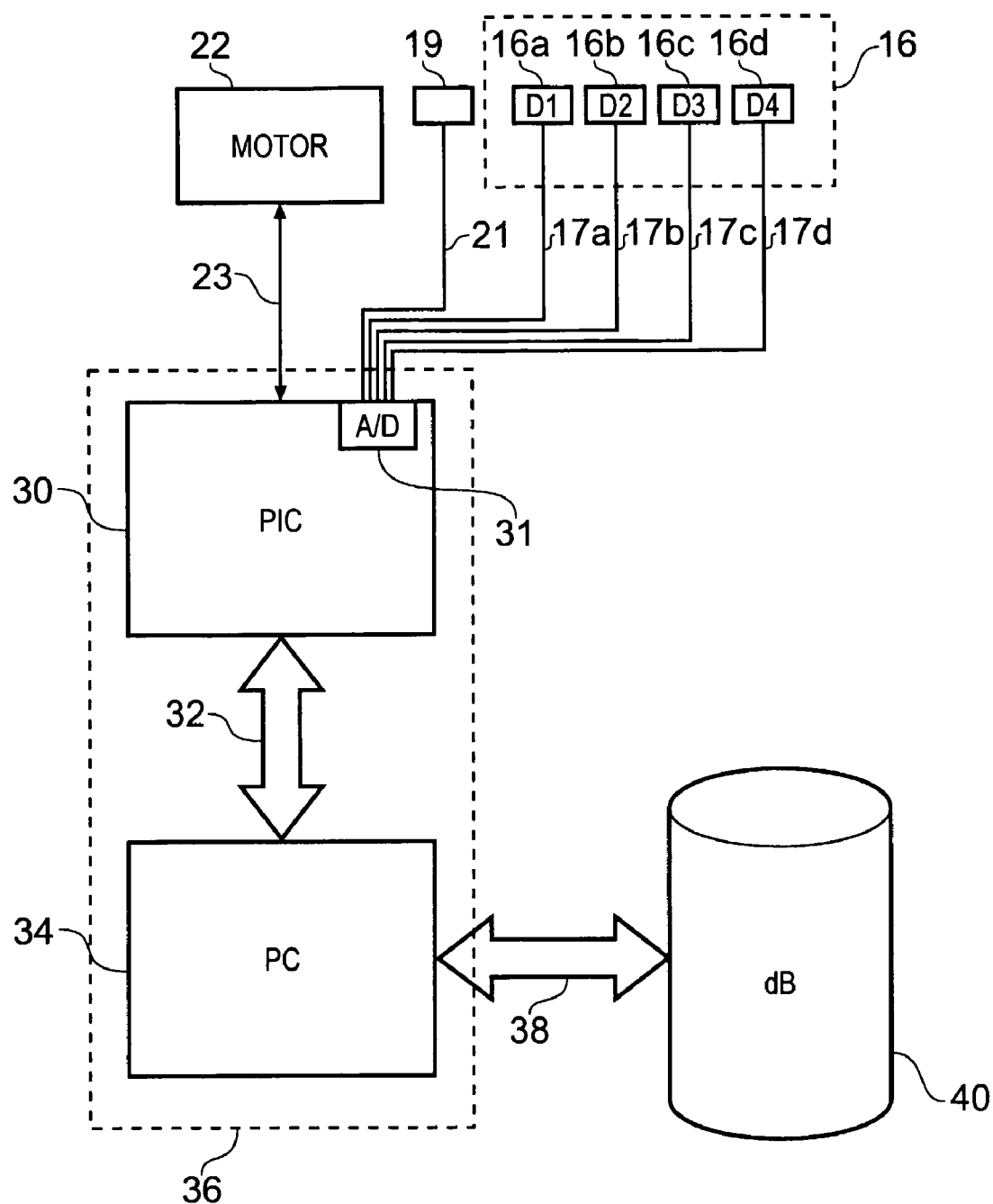
FIG. 3 is a block schematic diagram of the functional components of the reader apparatus.

FIG. 3 is a block schematic diagram of the functional components of the reader apparatus. The motor 22 is connected to a programmable interrupt controller (PIC) 30 through an electrical link 23. The detectors 16a . . . d of the detector module 16 are connected through respective electrical connection lines 17a . . . d to an analogue-to-digital converter (ADC) that is part of the PIC 30. A similar electrical connection line 21 connects the marker reading detector 19 to the PIC 30. It will be understood that optical or wireless links may be used instead of, or in combination with, electrical links. The PIC 30 is interfaced with a personal computer (PC) 34 through a serial connection 32. The PC 34 may be a desktop, laptop or hand-held PC. As an alternative to a PC, other intelligent devices may be used, for example a personal digital assistant (PDA). When using a PDA, the reader electronics can be fitted within the constraints of typical PDA conformant form factors, such as the Personal Computer Memory Card International Association (PCMCIA), Compact Flash (CF), "newcard" and Secure Digital Input/Output (SDIO) form factors. The reader electronics card can then be connected easily and quickly into a host PDA to make the reader. The PDA may be provided with integrated wireless telephony or wireless LAN capability for accessing the database, and possibly numeric processing capability, remotely, e.g. on a web server. Another alternative is to use a dedicated electronics unit without sophisticated processing capabilities for the reader, with all intensive numeric processing being performed remotely.

The PIC 30 and PC 34 collectively form a data acquisition and processing module 36 for determining a signature of the article from the set of data points collected by the detectors 16a . . . d. The PC 34 has access through an interface connection 38 to a database (dB) 40. The database 40 may be resident on the PC 34 in memory, or stored on a drive thereof. Alternatively, the database 40 may be remote from the PC 34 and accessed by wireless communication, for example using mobile telephony services or a wireless local area network (LAN) in combination with the internet. Moreover, the database 40 may be stored locally on the PC 34, but periodically downloaded from a remote source.

The database 40 contains a library of previously recorded signatures. The PC 34 is programmed so that in use it accesses the database 40 and performs a comparison to establish whether the database 40 contains a match to the signature of the article that has been placed in the reading volume. The PC 34 may also be programmed to allow a signature to be added to the database if no match is found. This mode of use is reserved for use by authorised users and may be omitted from systems that are to be used in the field exclusively for verification purposes.

Figure 4:
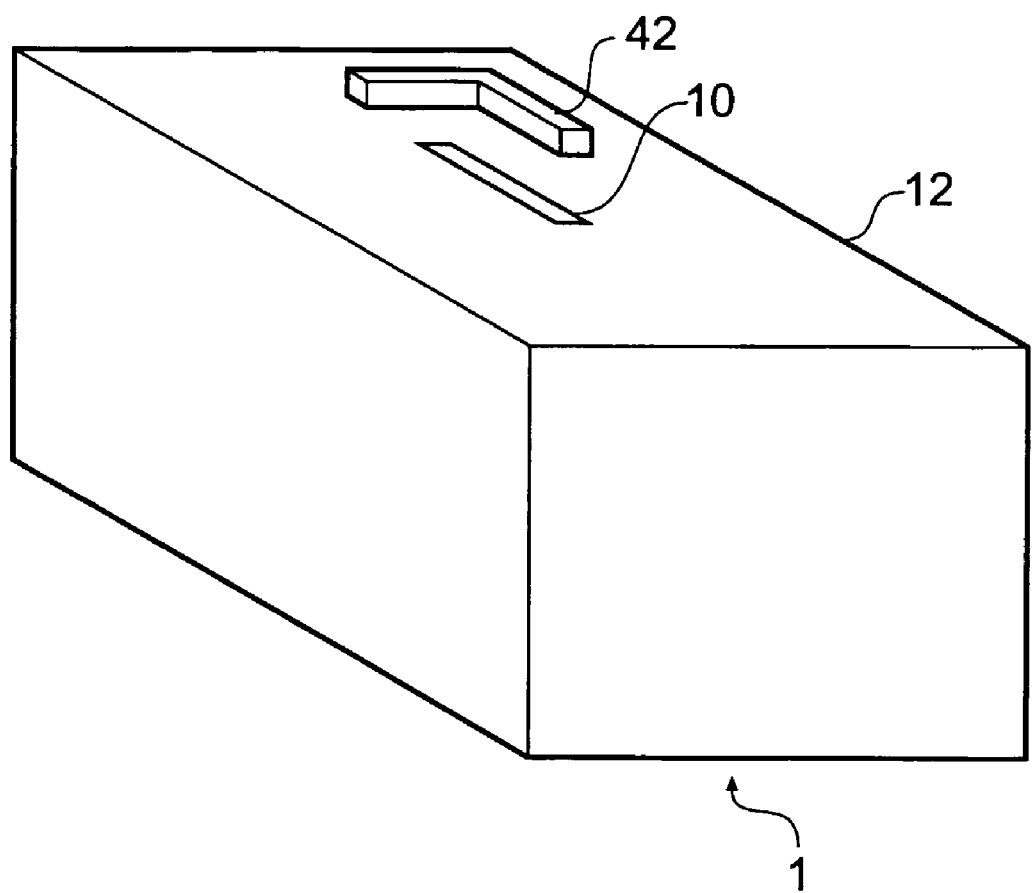
FIG. 4 is a perspective view of the reader apparatus showing its external form.

FIG. 4 is a perspective view of the reader apparatus 1 showing its external form. The housing 12 and slit-shaped reading aperture 10 are evident. A physical location aid 42 is also apparent and is provided for positioning an article of a given form in a fixed position in relation to the reading aperture 10. In the illustrated example, the physical location aid 42 is in the form of a right-angle bracket in which the corner of a document or packaging box can be located. This ensures that the same part of the article can be positioned in the reading aperture 10 whenever the article needs to be scanned. A simple angle bracket or equivalent, is sufficient for articles with a well-defined corner, such as sheets of paper, passports, ID cards and packaging boxes.

A document feeder could be provided to ensure that the article placement was consistent. For example, the apparatus could follow any conventional format for document scanners, photocopiers or document management systems. For packaging boxes, an alternative would be to provide a suitable guide hole, for example a rectangular cross-section hole for accepting the base of a rectangular box or a circular cross-section hole for accepting the base of a tubular box (i.e. cylindrical box).

Figure 5:
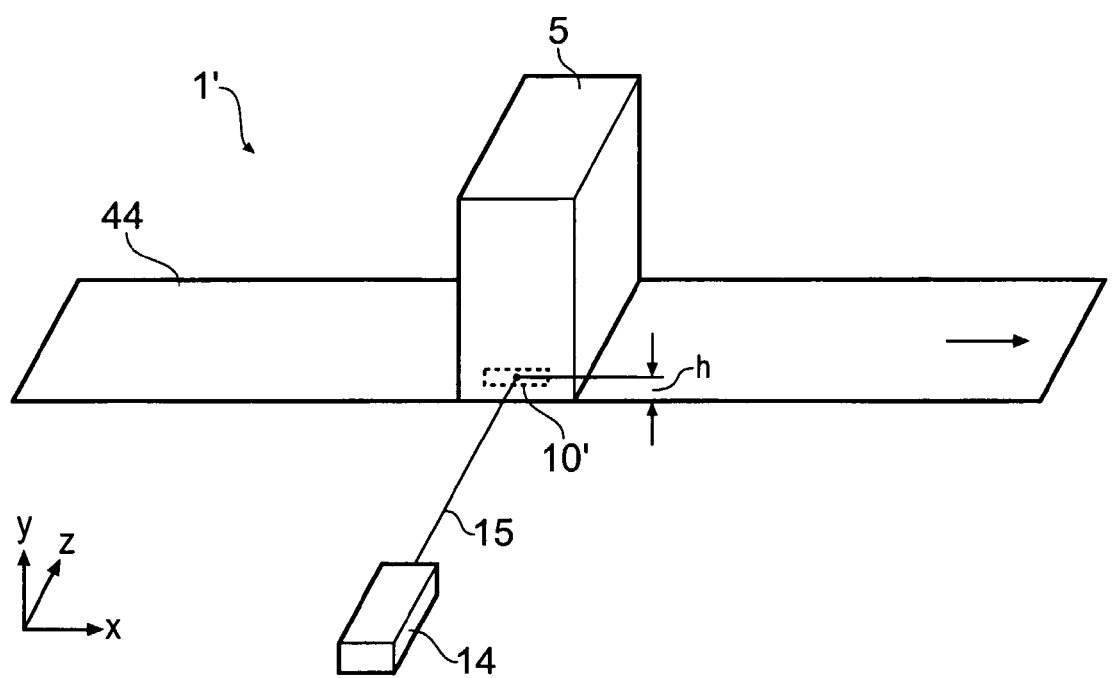
FIG. 5 is a schematic perspective view of an alternative embodiment of the reader apparatus.

FIG. 5 is a schematic perspective view of an alternative embodiment showing a reader apparatus 1' intended for screening batches of articles. The reader is based on a conveyor belt 44 on which articles of packaging can be placed, only one article 5 being illustrated for simplicity of representation. A reading area 10' on the article 5 is scanned by a static laser beam 15 as the article 5 passes on the conveyor belt 44. The laser beam 15 is generated by a laser source 14 arranged fixed in position beside the conveyor belt 44. The laser source 14 has an integral beam focusing lens (not shown) for producing a pencil-like near-collimated beam that travels in the z direction (i.e. horizontal to the floor) to pass over the conveyor belt 44 at a height 'h', thereby intersecting with the article 5 at a height 'h' to scan over the reading area 10'. The beam cross-section may be a spot, i.e. circular (e.g. produced with integral spherical lens), or a line extending in the y direction (e.g. produced with integral cylindrical lens). Although only one article is shown, it will be appreciated that a stream of similar articles can be conveyed and scanned in succession as they pass through the beam 15.

The functional components of the conveyor-based reader apparatus are similar to those of the stand-alone reader apparatus described further above. The only difference of substance is that the article is moved rather than the laser beam, in order to generate the desired relative motion between scan beam and article.

It is envisaged that the conveyor-based reader can be used in a production line or warehouse environment for populating a database with signatures by reading a succession of articles. As a control, each article may be scanned again to verify that the recorded signature can be verified. This could be done with two systems operating in series, or one system through which each article passes twice. Batch scanning could also be applied at point of sale (POS), or using a reader apparatus that was based on POS equipment components.

The above-described embodiments are based on localised excitation with a coherent light beam of small cross-section in combination with detectors that accept light signal scattered over a much larger area that includes the local area of excitation. It is possible to design a functionally equivalent optical system which is instead based on directional detectors that collect light only from localised areas in combination with excitation of a much larger area.

Figure 6A:
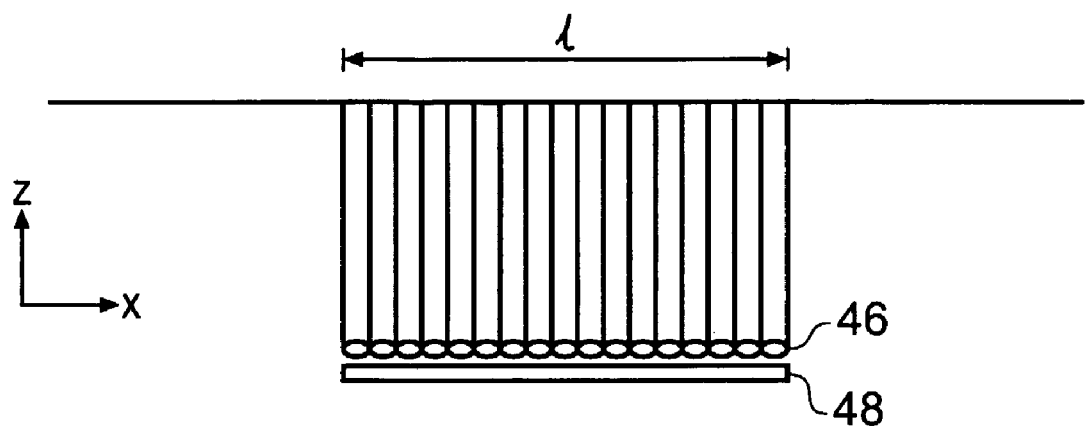
FIG. 6A shows schematically in side view an alternative imaging arrangement for a reader embodying the invention based on directional light collection and blanket illumination.

FIG. 6A shows schematically in side view such an imaging arrangement for a reader embodying the invention which is based on directional light collection and blanket illumination with a coherent beam. An array detector 48 is arranged in combination with a cylindrical microlens array 46 so that adjacent strips of the detector array 48 only collect light from corresponding adjacent strips in the reading volume. With reference to FIG. 2, each cylindrical microlens is arranged to collect light signal from one of the n sampling strips. The coherent illumination can then take place with blanket illumination of the whole reading volume (not shown in the illustration).

A hybrid system with a combination of localised excitation and localised detection may also be useful in some cases.

Figure 6B:
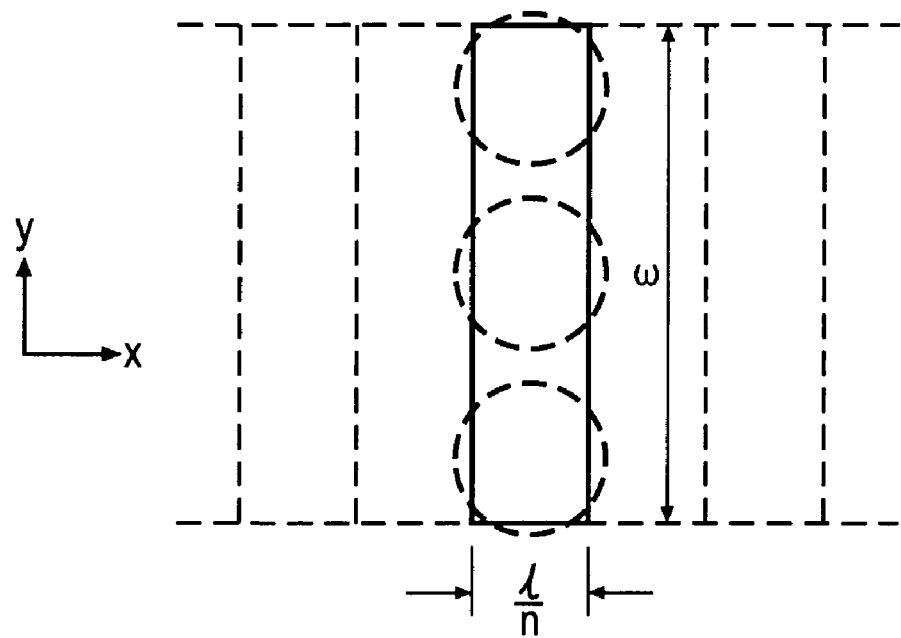
FIG. 6B shows schematically in plan view the optical footprint of a further alternative imaging arrangement for a reader embodying the invention in which directional detectors are used in combination with localised illumination with an elongate beam.

FIG. 6B shows schematically in plan view the optical footprint of such a hybrid imaging arrangement for a reader embodying the invention in which directional detectors are used in combination with localised illumination with an elongate beam. This embodiment may be considered to be a development of the embodiment of FIG. 1 in which directional detectors are provided. In this embodiment three banks of directional detectors are provided, each bank being targeted to collect light from different portions along the 'l×w' excitation strip. The collection area from the plane of the reading volume are shown with the dotted circles, so that a first bank of, for example 2, detectors collects light signal from the upper portion of the excitation strip, a second bank of detectors collects light signal from a middle portion of the excitation strip and a third bank of detectors collects light from a lower portion of the excitation strip. Each bank of detectors is shown having a circular collection area of diameter approximately l/m, where m is the number of subdivisions of the excitation strip, where m=3 in the present example. In this way the number of independent data points can be increased by a factor of m for a given scan length l. As described further below, one or more of different banks of directional detectors can be used for a purpose other than collecting light signal that samples a speckle pattern. For example, one of the banks may be used to collect light signal in a way optimised for barcode scanning. If this is the case it will generally be sufficient for that bank to contain only one detector, since there will be no advantage obtaining cross-correlations when only scanning for contrast.

Having now described the principal structural components and functional components of various reader apparatuses suitable for carrying out the invention, the numerical processing used to determine a signature is now described. It will be understood that this numerical processing is implemented for the most part in a computer program that runs on the PC 34 with some elements subordinated to the PIC 30.

Figure 7:
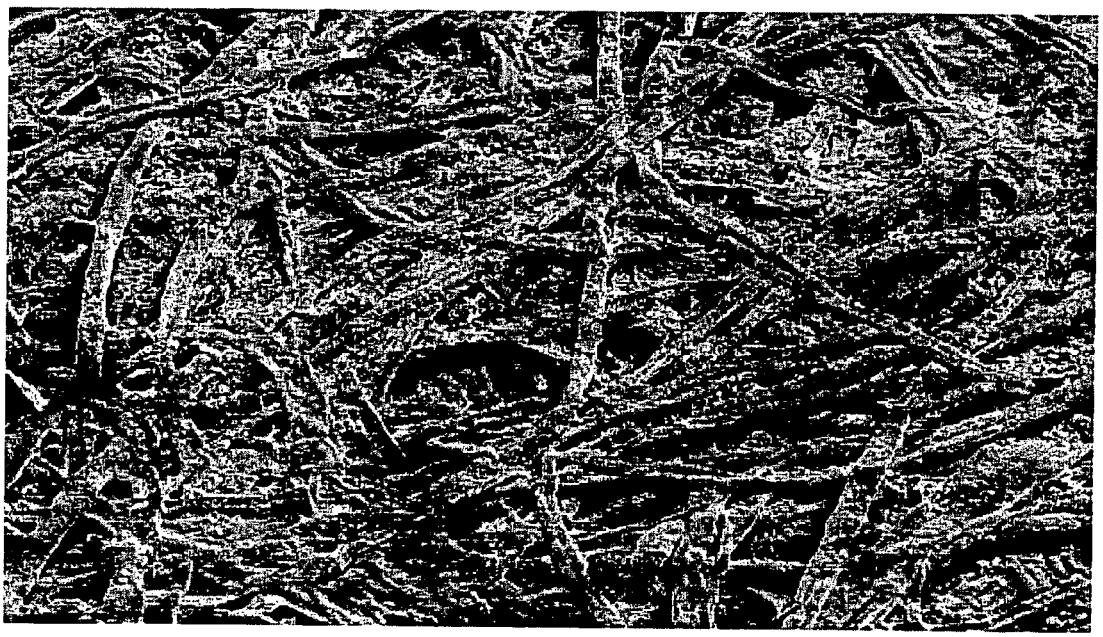
FIG. 7 is a microscope image of a paper surface with the image covering an area of approximately 0.5×0.2 mm.

FIG. 7 is a microscope image of a paper surface with the image covering an area of approximately 0.5×0.2 mm. This figure is included to illustrate that macroscopically flat surfaces, such as from paper, are in many cases highly structured at a microscopic scale. For paper, the surface is microscopically highly structured as a result of the intermeshed network of wood fibres that make up paper. The figure is also illustrative of the characteristic length scale for the wood fibres which is around 10 microns. This dimension has the correct relationship to the optical wavelength of the coherent beam to cause diffraction and hence speckle, and also diffuse scattering which has a profile that depends upon the fibre orientation. It will thus be appreciated that if a reader is to be designed for a specific class of goods, the wavelength of the laser can be tailored to the structure feature size of the class of goods to be scanned. It is also evident from the figure that the local surface structure of each piece of paper will be unique in that it depends on how the individual wood fibres are arranged. A piece of paper is thus no different from a specially created token, such as the special resin tokens or magnetic material deposits of the prior art, in that it has structure which is unique as a result of it being made by a process governed by laws of nature. The same applies to many other types of article.

The data collection and numerical processing of a scatter signal that takes advantage of the natural structure of an article's surface (or interior in the case of transmission) is now described.

Figure 8A:
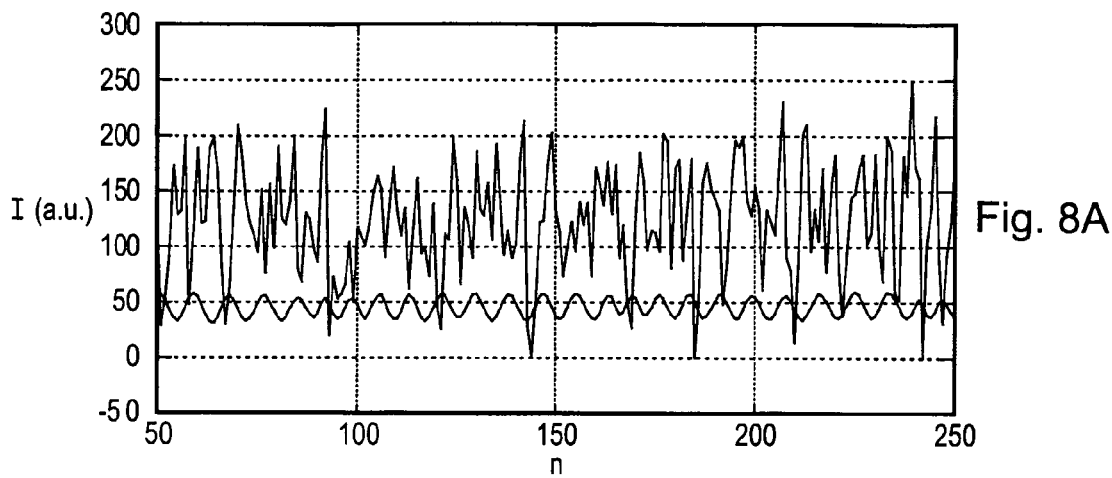
FIG. 8A shows raw data from a single photodetector using the reader of FIG. 1 which consists of a photodetector signal and an encoder signal.

FIG. 8A shows raw data from a single one of the photodetectors 16a . . . d of the reader of FIG. 1. The graph plots signal intensity I in arbitrary units (a.u.) against point number n (see FIG. 2). The higher trace fluctuating between I=0-250 is the raw signal data from photodetector 16a. The lower trace is the encoder signal picked up from the markers 28 (see FIG. 2) which is at around I=50.

Figure 8B:
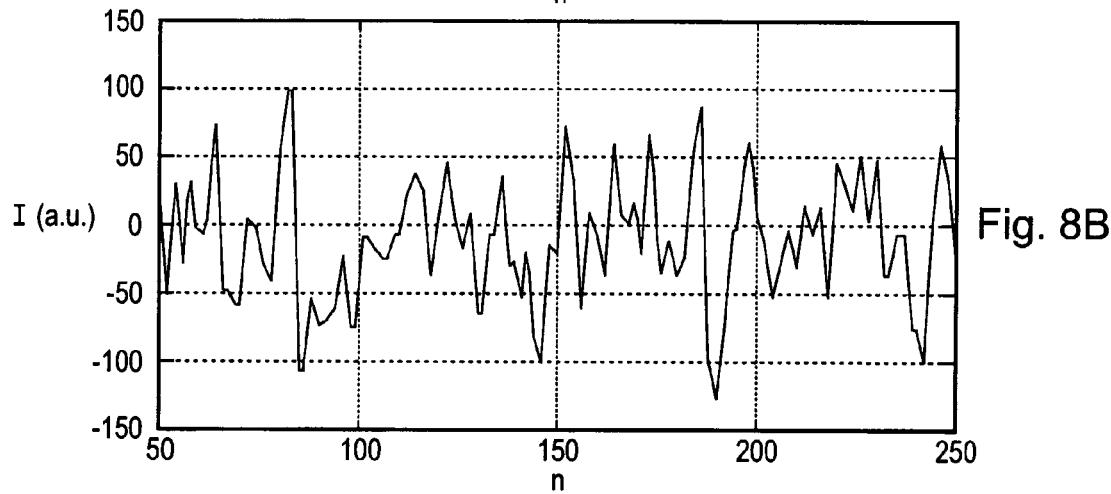
FIG. 8B shows the photodetector data of FIG. 8A after linearisation with the encoder signal and averaging the amplitude.

FIG. 8B shows the photodetector data of FIG. 8A after linearisation with the encoder signal (n.b. although the x axis is on a different scale from FIG. 8A, this is of no significance). In addition, the average of the intensity has been computed and subtracted from the intensity values. The processed data values thus fluctuate above and below zero.

Figure 8C:
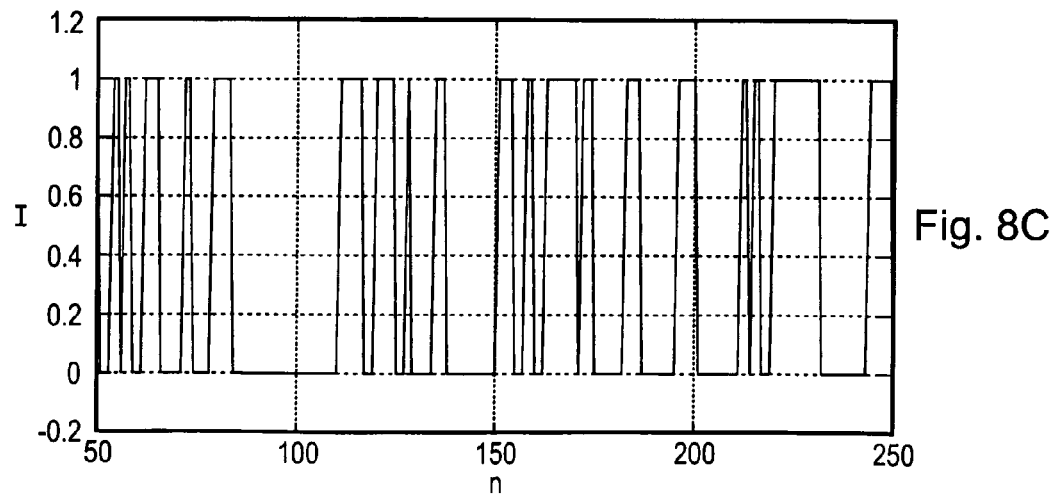
FIG. 8C shows the data of FIG. 8B after digitisation according to the average level.

FIG. 8C shows the data of FIG. 8B after digitisation. The digitisation scheme adopted is a simple binary one in which any positive intensity values are set at value 1 and any negative intensity values are set at zero. It will be appreciated that multi-state digitisation could be used instead, or any one of many other possible digitisation approaches. The main important feature of the digitisation is merely that the same digitisation scheme is applied consistently.

Figure 9:
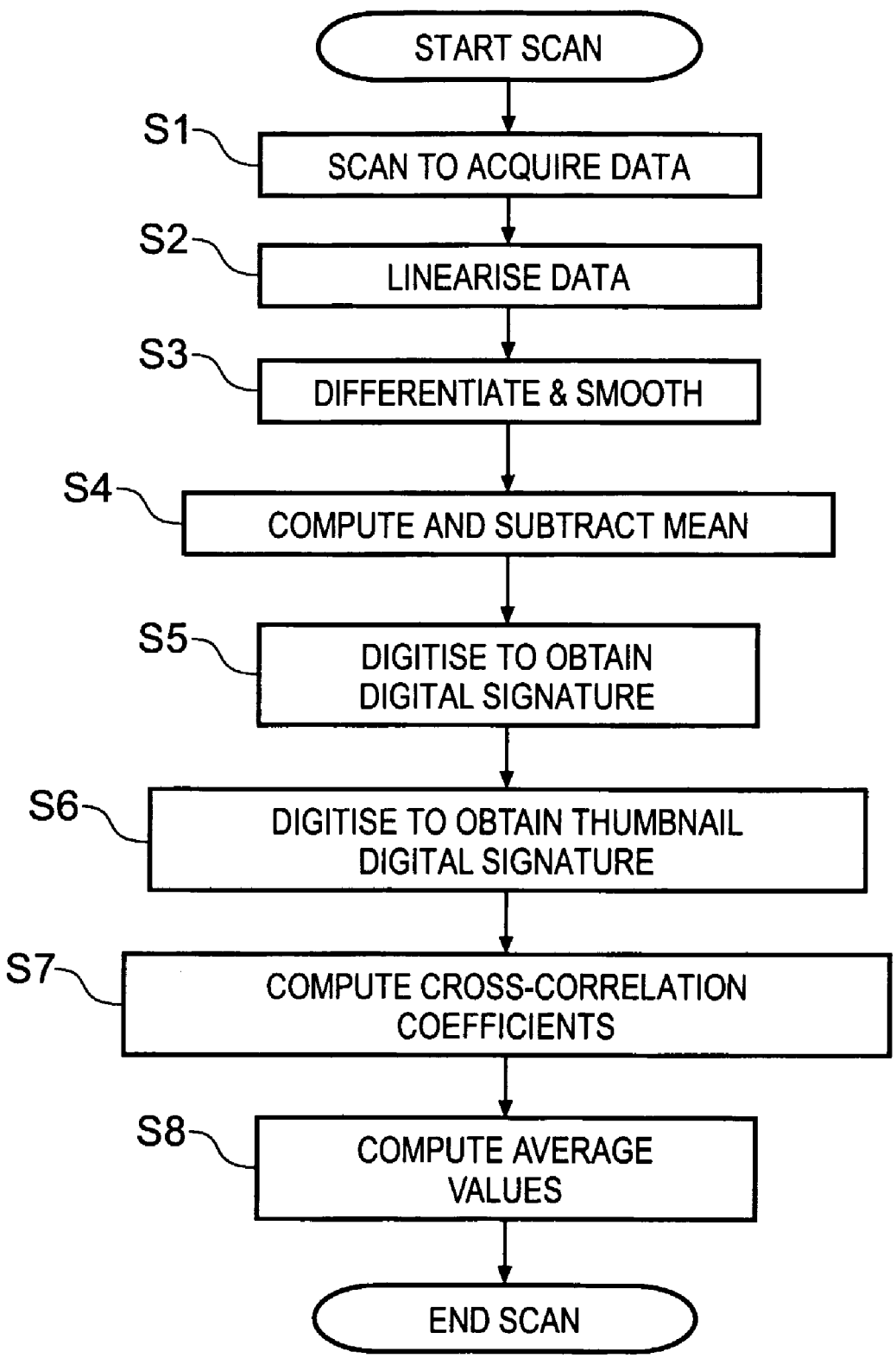
FIG. 9 is a flow diagram showing how a signature of an article is generated from a scan.

FIG. 9 is a flow diagram showing how a signature of an article is generated from a scan.

Step S1 is a data acquisition step during which the optical intensity at each of the photodetectors is acquired approximately every 1 ms during the entire length of scan. Simultaneously, the encoder signal is acquired as a function of time. It is noted that if the scan motor has a high degree of linearisation accuracy (e.g. as would a stepper motor) then linearisation of the data may not be required. The data is acquired by the PIC 30 taking data from the ADC 31. The data points are transferred in real time from the PIC 30 to the PC 34. Alternatively, the data points could be stored in memory in the PIC 30 and then passed to the PC 34 at the end of a scan. The number n of data points per detector channel collected in each scan is defined as N in the following. Further, the value $a_k(i)$ is defined as the i-th stored intensity value from photodetector k, where i runs from 1 to N. Examples of two raw data sets obtained from such a scan are illustrated in FIG. 8A.

Step S2 uses numerical interpolation to locally expand and contract $a_k(i)$ so that the encoder transitions are evenly spaced in time. This corrects for local variations in the motor speed. This step is performed in the PC 34 by a computer program.

Step S3 is an optional step. If performed, this step numerically differentiates the data with respect to time. It may also be desirable to apply a weak smoothing function to the data. Differentiation may be useful for highly structured surfaces, as it serves to attenuate uncorrelated contributions from the signal relative to correlated (speckle) contributions.

Step S4 is a step in which, for each photodetector, the mean of the recorded signal is taken over the N data points. For each photodetector, this mean value is subtracted from all of the data points so that the data are distributed about zero intensity. Reference is made to FIG. 8B which shows an example of a scan data set after linearisation and subtraction of a computed average.

Step S5 digitises the analogue photodetector data to compute a digital signature representative of the scan. The digital signature is obtained by applying the rule: $a_k(i) > 0$ maps onto binary '1' and $a_k(i) < 0$ maps onto binary '0'. The digitised data set is defined as $d_k(i)$ where i runs from 1 to N.

Step S6 creates a 'thumbnail' digital signature. This is done by computing the Fourier Transform of $a_k(i)$. The amplitude spectrum is referred to as $A_k(i)$ and the phase spectrum is referred to as $\Phi_k(i)$. The amplitude spectrum $A_k(i)$ is then digitised. The digitised amplitude spectrum is denoted $D_k(i)$. For the digitisation it is noted that it is not possible to apply the simple rule used to obtain the full digital signature referred to above in Step S5, since the amplitude spectrum is always positive and a simple threshold test against zero cannot be used to digitize it. We propose one of two digitisation methods for the thumbnail signature. For the first method, a threshold value is defined for each channel of the amplitude spectrum. The set of threshold values is denoted g(i). Then the amplitude spectrum is digitized by applying the rule $A(i) > g(i)$ maps onto 1, and $A(i) <= g(i)$ maps onto 0. The threshold values g(i) can be determined by considering a sample of different signatures and taking the mean value for each channel of the amplitude spectrum. For the second method, one differentiates the amplitude spectrum A(i) with respect to i to form A'(i). This will now have both positive and negative values. Then the amplitude spectrum is digitized by applying the rule $A'(i) > 0$ maps onto 1, and $A'(i) <= 0$ maps onto 0. In this case, it is more efficient to store A'(i) as the thumbnail in the database instead of A(i), otherwise it would be necessary to differentiate every record every time the database is searched. The 'thumbnail' digital signature is then created from $D_k(i)$ by either taking the first L bits (a typical value for L is 128) or by picking every m-th bit of $D_k(i)$ to form a thumbnail digital signature of length L bits (a typical value for m is 4).

Step S7 is an optional step applicable when multiple detector channels exist. The additional component is a cross-correlation component calculated between the intensity data obtained from different ones of the photodetectors. With 2 channels there is one possible cross-correlation coefficient, with 3 channels up to 3, and with 4 channels up to 6 etc. The cross-correlation coefficients are useful, since it has been found that they are good indicators of material type. For example, for a particular type of document, such as a passport of a given type, or laser printer paper, the cross-correlation coefficients always appear to lie in predictable ranges. A normalised cross-correlation can be calculated between $a_k(i)$ and $a_l(i)$, where $k \neq l$ and k, l vary across all of the photodetector channel numbers. The normalised cross-correlation function $\Gamma$ is defined as $$\Gamma(k,l) = \frac{\sum_{i=1}^{N} a_k(i) a_l(i)}{\sqrt{\left(\sum_{i=1}^{N} a_k(i)^2\right)\left(\sum_{i=1}^{N} a_l(i)^2\right)}}$$

The use of the cross-correlation coefficients in verification processing is described further below.

Step S8 is another optional step which is to compute a simple intensity average value indicative of the signal intensity distribution. This may be an overall average of each of the mean values for the different detectors or an average for each detector, such as a root mean square (rms) value of $a_k(i)$. If the detectors are arranged in pairs either side of normal incidence as in the reader described above, an average for each pair of detectors may be used. The intensity value has been found to be a good crude filter for material type, since it is a simple indication of overall reflectivity and roughness of the sample. For example, one can use as the intensity value the unnormalised rms value after removal of the average value, i.e. the DC background.

The signature data obtained from scanning an article can be compared against records held in a signature database for verification purposes and/or written to the database to add a new record of the signature to extend the existing database, in each case using the thumbnail derived from the Fourier transform amplitude spectrum as well as the full digital signature.

A new database record will include the digital signature obtained in Step S5 as well as its thumbnail version obtained in Step S6 for each photodetector channel, and optionally also the cross-correlation coefficients obtained in Step S7 and the average value(s) obtained in Step S8. The thumbnails may be stored on a separate database of their own optimised for rapid searching, and the rest of the data (including the thumbnails) on a main database.

Figure 10:
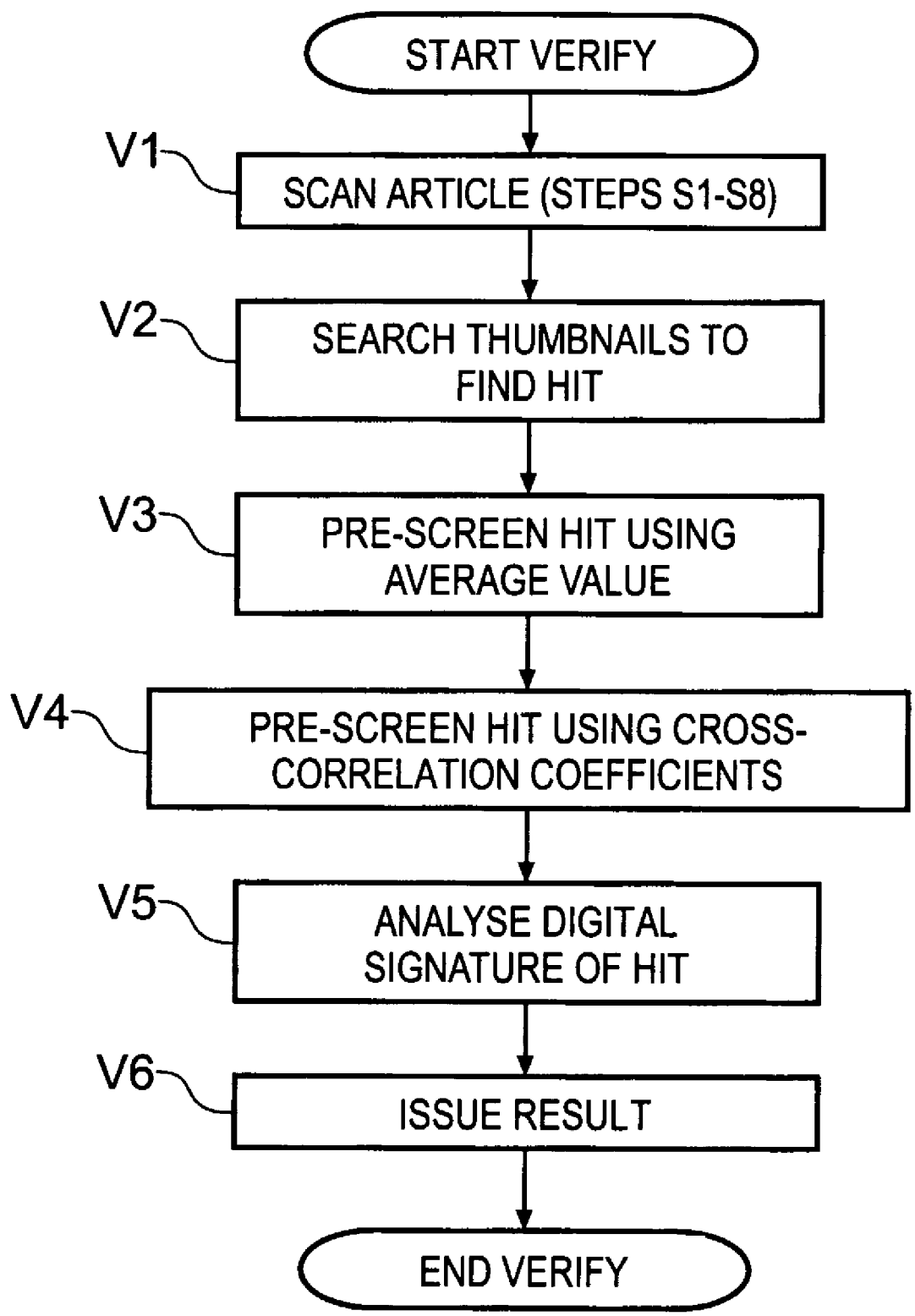
FIG. 10 is a flow diagram showing how a signature of an article obtained from a scan can be verified against a signature database.

FIG. 10 is a flow diagram showing how a signature of an article obtained from a scan can be verified against a signature database.

To provide a rapid verification process, the verification process is carried out in two main steps, first using the thumbnails derived from the amplitude component of the Fourier transform of the scan data (and optionally also pre-screening based on the computed average values and cross-correlation coefficients) as now described, and second by comparing the scanned and stored full digital signatures with each other.

Verification Step V1 is the first step of the verification process, which is to scan an article according to the process described above, i.e. to perform Scan Steps S1 to S8.

Verification Step V2 seeks a candidate match using the thumbnail derived from the Fourier transform amplitude component of the scan signal, which is obtained as explained above with reference to Scan Step S6. Verification Step V2 takes each of the thumbnail entries and evaluates the number of matching bits between it and $t_k(i+j)$, where j is a bit offset which is varied to compensate for errors in placement of the scanned area. The value of j is determined and then the thumbnail entry which gives the maximum number of matching bits. This is the 'hit' used for further processing. A variation on this would be to include the possibility of passing multiple candidate matches for full testing based on the full digital signature. The thumbnail selection can be based on any suitable criteria, such as passing up to a maximum number of, for example 10, candidate matches, each candidate match being defined as the thumbnails with greater than a certain threshold percentage of matching bits, for example 60%. In the case that there are more than the maximum number of candidate matches, only the best 10 are passed on. If no candidate match is found, the article is rejected (i.e. jump to Verification Step V6 and issue a fail result).

This thumbnail based searching method delivers an overall improved search speed, for the following reasons. A pseudo-random bit sequence, when Fourier transformed, carries some of the information in the amplitude spectrum and some in the phase spectrum. Any bit shift only affects the phase spectrum, however, and not the amplitude spectrum. Amplitude spectra can therefore be matched without any knowledge of the bit shift. Although some information is lost in discarding the phase spectrum, enough remains in order to obtain a rough match against the database. This allows one or more putative matches to the target to be located in the database. Each of these putative matches can then be compared properly using the conventional real-space method against the new scan.

Verification Step V3 is an optional pre-screening test that is performed before analysing the full digital signature stored for the record against the scanned digital signature. In this pre-screen, the rms values obtained in Scan Step S8 are compared against the corresponding stored values in the database record of the hit. The 'hit' is rejected from further processing if the respective average values do not agree within a pre-defined range. The article is then rejected as non-verified (i.e. jump to Verification Step V6 and issue fail result).

Verification Step V4 is a further optional pre-screening test that is performed before analysing the full digital signature. In this pre-screen, the cross-correlation coefficients obtained in Scan Step S7 are compared against the corresponding stored values in the database record of the hit. The 'hit' is rejected from further processing if the respective cross-correlation coefficients do not agree within a predefined range. The article is then rejected as non-verified (i.e. jump to Verification Step V6 and issue fail result).

Verification Step V5 is the main comparison between the scanned digital signature obtained in Scan Step S5 and the corresponding stored values in the database record of the hit. The full stored digitised signature, $d_k^{db}(i)$ is split into n blocks of q adjacent bits on k detector channels, i.e. there are qk bits per block. A typical value for q is 4 and a typical value for k is 4, making typically 16 bits per block. The qk bits are then matched against the qk corresponding bits in the stored digital signature $d_k^{db}(i+j)$. If the number of matching bits within the block is greater or equal to some pre-defined threshold $z_{thresh}$, then the number of matching blocks is incremented. A typical value for $z_{thresh}$ is 13. This is repeated for all n blocks. This whole process is repeated for different offset values of j, to compensate for errors in placement of the scanned area, until a maximum number of matching blocks is found. Defining M as the maximum number of matching blocks, the probability of an accidental match is calculated by evaluating:

$$p(M) = \sum_{w=n-M}^{n} s^w (1-s)^{n-w} {}_w^n C$$

where s is the probability of an accidental match between any two blocks (which in turn depends upon the chosen value of $z_{threshold}$), M is the number of matching blocks and p(M) is the probability of M or more blocks matching accidentally. The value of s is determined by comparing blocks within the database from scans of different objects of similar materials, e.g. a number of scans of paper documents etc. For the case of q=4, k=4 and $z_{threshold}$=13, we find a typical value of s is 0.1. If the qk bits were entirely independent, then probability theory would give s=0.01 for $z_{threshold}$=13. The fact that we find a higher value empirically is because of correlations between the k detector channels and also correlations between adjacent bits in the block due to a finite laser spot width. A typical scan of a piece of paper yields around 314 matching blocks out of a total number of 510 blocks, when compared against the database entry for that piece of paper. Setting M=314, n=510, s=0.1 for the above equation gives a probability of an accidental match of $10^{-177}$.

Verification Step V6 issues a result of the verification process. The probability result obtained in Verification Step V5 may be used in a pass/fail test in which the benchmark is a pre-defined probability threshold. In this case the probability threshold may be set at a level by the system, or may be a variable parameter set at a level chosen by the user. Alternatively, the probability result may be output to the user as a confidence level, either in raw form as the probability itself, or in a modified form using relative terms (e.g. no match/poor match/good match/excellent match) or other classification. In our experiments with paper, we generally find that 75% of bits in agreement represents a good or excellent match, whereas 50% bits in agreement represents no match.

By way of example, we find that a database comprising 1 million records, with each record containing a 128-bit thumbnail of the Fourier transform amplitude spectrum, can be searched in 1.7 seconds on a standard PC computer of 2004 specification. 10 million entries can be searched in 17 seconds. We would expect high-end server computers to achieve up to 10 times faster than this.

A further implementation of the invention is now described.

Figure 11:
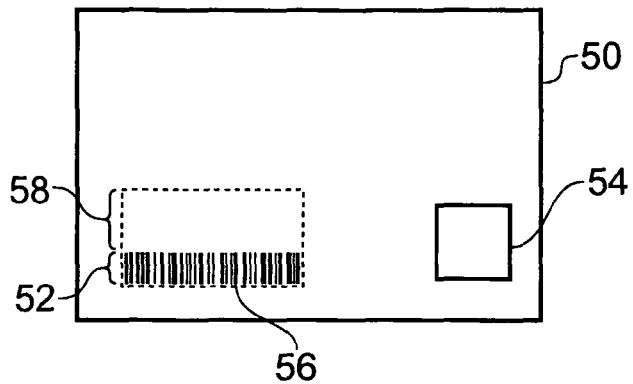
FIG. 11 is a schematic plan view of an ID card bearing a barcode label that encodes a digital signature obtained from an intrinsic measured surface characteristic.

FIG. 11 shows an ID card 50 bearing a barcode. The ID card may also bear an independent security element 54 such as a photograph, hologram or contain some biometric information specific to an individual. The barcode is shown as part of a scan area 56. This is illustrated with a dashed line, since it is featureless on the ID card. The scan area is subdivided between a lower area 52 containing the barcode and a blank upper area 58. The ID card 50 is designed to be scanned by a reader apparatus of the kind illustrated in FIG. 6B, where one of the directional detector banks is used to scan the barcode area 52 and the other two banks to scan the upper area 58. The purpose of the barcode is to encode an approximate record locator for speeding up access to the database, as now explained.

For many applications, a database of 1-10 million entries will be adequate. However, in some applications larger numbers of entries may be required. It is also noted that larger databases are technologically feasible, since a standard modern (2004 specification) 100 GB hard disk could potentially store 1000-2000 million entries which would be sufficient for a piece of documentation for every person of even the most populous countries. With current technology, the search time of such a large database is potentially prohibitively long using the basic search technique described above, even with the speed advantage of using thumbnails derived from Fourier transform amplitude spectra to substantially eliminate processing time caused by registry errors between the original scan and the re-scan.

The barcode, which need only be relatively short (12-16 bits), is read by the same scanning laser that reads the speckle signature. This barcode acts as a record locator in the database. The barcode does not identify the precise database entry, but simply point to the correct 'chapter' of the database, leaving the rapid search algorithm described above to identify the correct signature among the perhaps 1 million records per chapter. A 12 bit barcode would allow 4096 different chapters to be distinguished, allowing a match to be found in a database of up to 4000 million records.

The use of a barcode as only an approximate (i.e. not a precise) record locator has two advantages. First, the barcode can be a conventional low-precision 1D barcode without stringent printing requirements or the need for more sophisticated 2D readers. Second, since the barcode will only locate the database entry to within a "chapter" of perhaps 1 million entries, there is no need to encrypt the barcode with an asymmetric encryption algorithm.

The barcode is applied at the time of manufacture of the ID card by scanning the blank upper area of the card according to the method of the invention, allocating a chapter number to the record used to store the digital signature, and then printing the barcode onto the lower area 52 encoding the record's chapter number. The ID card is thus labelled with an approximate record locator for the digital signature of the intrinsic structure of the article, namely the surface structure in the upper area 58.

It is noted that the barcode may itself be used for linearisation of the scan instead of or in combination with the separate linearisation marks described above. This may be especially useful when the reader has a drive with poor linearity, such as a roller drive of the kind used in automated telling machines (ATMs) for example. Tolerance to drives with poor linearity will allow a reader to be incorporated in many card reading devices such as ATMs with minimum modification. Indeed, a barcode, or even dummy markings, may be printed on the card solely for the purpose of linearisation and not used for the encryption at all. In that case, verification could be performed using reference to a database or by taking data from another part of the card, for example by taking data from a chip (so-called smart card).

As well as using a barcode for storing an approximate record locator, a barcode may be used to mark the article with a label that encodes the articles own signature obtained from its intrinsic physical properties, for example any printable article, including paper or cardboard articles or plastic articles.

In this case, given the public nature of the barcode or other label that follows a publicly known encoding protocol, it is advisable to make sure that the signature has been transformed using an asymmetric encryption algorithm for creation of the barcode, i.e. a one-way function is used, such as according to the well known RSA algorithm. A preferred implementation is for the label to represent a public key in a public key/private key encryption system. If the system is used by a number of different customers, it is advisable that each customer has its own private key, so that disclosure of a private key will only affect one customer. The label thus encodes the public key and the private key is located securely with the authorised persons.

A further perceived advantage of the labelling approach is that a novice user would be unaware of the verification being carried out without special knowledge. It would be natural for the user to assume that the reader apparatus was simply a barcode scanner, and it was the barcode that was being scanned.

Such a labelling scheme could be used to allow articles to be verified without access to a database purely on the basis of the label. This is a similar approach conceptually to the failed banknote scheme reported in the prior art [3].

Such a labelling scheme in which the label encodes the article's own signature could be used in combination with a labelling scheme in which the label represents an approximate record locator, as described above. For example, the barcode could encode a thumbnail form of the digital signature and be used to allow a rapid pre-screen prior to screening with reference to a database. As explained above, this could be a very important approach in practice, since potentially in some database applications, the number of records could become huge (e.g. millions) and searching strategies would become critical. Intrinsically high speed searching techniques, such as the use of bitstrings, could become important.

As explained above, as an alternative to the barcode encoding a thumbnail, the barcode (or other label) can encode a record locator, i.e. be an index or bookmark, which can be used to rapidly find the correct signature in the database for further comparison.

Another variant is that the barcode (or other label) encodes a thumbnail signature, such as one derived from the Fourier transform amplitude component of the scan data as described above, which can be used to get a match with reasonable but not high confidence if a database is not available (e.g. temporarily off-line, or the scanning is being done in an unusually remote location without internet access). That same thumbnail can then be used for rapid record locating within the main database if the database is available, allowing a higher confidence verification to be performed.

Figure 12:
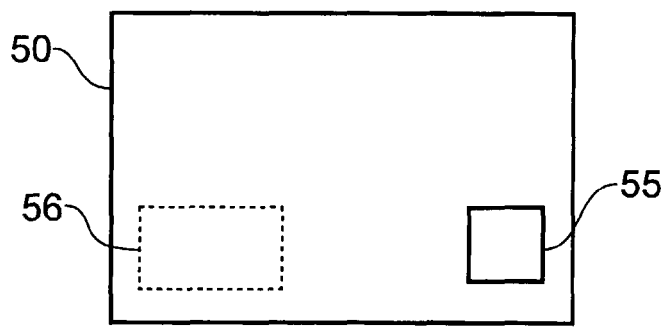
FIG. 12 is a schematic plan view of an ID card with a chip carrying data that encodes a digital signature obtained from an intrinsic measured surface characteristic.

FIG. 12 is a schematic plan view of an ID card 50 which is a so-called smart card that incorporates a data carrying chip 55. The data carried by the chip 55 includes signature encoding data that encodes a digital signature obtained from an intrinsic measured surface characteristic of the ID card 50 obtained from a scan area 56 which is featureless in this example as indicated by the dotted lines, but could be decorated in any desired way, or contain a photograph, for example.

Figure 13:
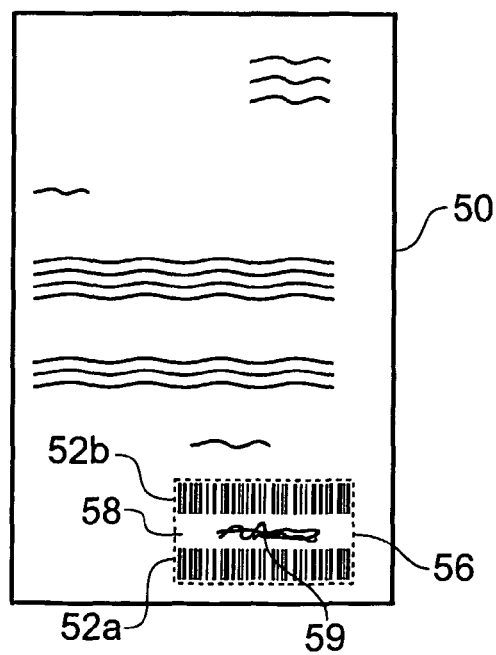
FIG. 13 is a schematic plan view of a warranty document bearing two barcode labels that encode a digital signature obtained from an intrinsic measured surface characteristic.

FIG. 13 is a schematic plan view of a warranty document 50. The scan area 56 includes two barcode labels 52*a*, 52*b* arranged one above the other. Barcode 52*a* encodes a digital signature obtained from an intrinsic measured surface characteristic, and barcode 52*b* encodes an approximate record locator similar to the ID card example of FIG. 11. The barcodes 52*a*, 52*b* are arranged above and below a digital signature scan area 58 for a person's signature 59 as schematically illustrated. The area 58 at least is preferably covered with a transparent adhesive covering for tamper protection.

Many other commercial examples will be envisaged, the above FIGS. 11 to 13 given by way of example only.

From the above detailed description it will be understood how an article made of material, such as paper or cardboard, or plastic, can be identified by exposing the material to coherent radiation, collecting a set of data points that measure scatter of the coherent radiation from intrinsic structure of the material, and determining a signature of the article from the set of data points.

It will also be understood that the scan area is essentially arbitrary in terms of its size or location on an article. If desired, the scan could be a linear scan rastered to cover a larger two-dimensional area, for example.

Moreover, it will be understood how this can be applied to identify a product by its packaging, a document or an item of clothing, by exposing the article to coherent radiation, collecting a set of data points that measure scatter of the coherent radiation from intrinsic structure of the article, and determining a signature, and a thumbnail, of the product from the set of data points.

From the above description of the numerical processing, it will be understood that degradation of the beam localisation (e.g. beam cross-section enlargement in the reading volume owing to sub-optimum focus of the coherent beam) will not be catastrophic to the system, but merely degrade its performance by increasing the accidental match probability. The apparatus is thus robust against apparatus variations giving a stable gradual degradation in performance rather than a sudden unstable failure. In any case, it is simple to perform a self test of a reader, thereby picking up any equipment problems, by performing an autocorrelation on the collected data to ascertain the characteristic minimum feature size in the response data.

A further security measure that can be applied to paper or cardboard, for example, is to adhesively bond a transparent seal (e.g. adhesive tape) over the scanned area. The adhesive is selected to be sufficiently strong that its removal will destroy the underlying surface structure which it is essential to preserve in order to perform a verification scan. The same approach can be applied to deposition of transparent polymer or plastic films on a card, or its encapsulation with similar materials.

As described above, the reader may be embodied in an apparatus designed specifically to implement the invention. In other cases, the reader will be designed by adding appropriate ancillary components to an apparatus principally designed with another functionality in mind, such as a photocopier machine, document scanner, document management system, POS device, ATM, air ticket boarding card reader or other device.

In summary, a digital signature is obtained by digitising a set of data points obtained by scanning a coherent beam over a paper, cardboard or other article, and measuring the scatter. A thumbnail digital signature is also determined by digitising an amplitude spectrum of a Fourier transform of the set of data points. A database of digital signatures and their thumbnails can thus be built up. The authenticity of an article can later be verified by re-scanning the article to determine its digital signature and thumbnail, and then searching the database for a match. Searching is done on the basis of the Fourier transform thumbnail to improve search speed. Speed is improved, since, in a pseudo-random bit sequence, any bit shift only affects the phase spectrum, and not the amplitude spectrum, of a Fourier transform represented in polar coordinates. The amplitude spectrum stored in the thumbnail can therefore be matched without any knowledge of the unknown bit shift caused by registry errors between the original scan and the re-scan.

Many other variations of the invention will be envisaged by the skilled person in addition to those specifically mentioned above.

REFERENCES

[1] GB 2 221 870 A—Ezra, Hare & Pugsley
[2] U.S. Pat. No. 6,584,214—Pappu, Gershenfeld & Smith
[3] Kravolec "Plastic tag makes foolproof ID" Technology Research News, 2 Oct. 2002
[4] R Anderson "Security Engineering: a guide to building dependable distributed systems" Wiley 2001, pages 251-252 ISBN 0-471-38922-6
[5] GB 0405641.2 (as yet unpublished and incorporated herein in its entirety by reference)

The invention claimed is:

1. A method of scanning an article arranged in a reading volume using an apparatus, the apparatus comprising a detector module and a data acquisition and processing module, the method comprising:
  collecting a set of data points from intensity signals obtained by the detector module when coherent light scatters from the reading volume, the set of data points comprising at least one data point relating to scatter from a first part of the reading volume and at least one data point relating to scatter from a second part of the reading volume;
  determining a digital signature of the article by digitising the set of data points using the data acquisition and processing module; and
  determining a thumbnail digital signature of the article by digitising an amplitude part of a Fourier transform of the set of data points using the data acquisition and processing module.

2. The method of claim 1, further comprising:
  storing the digital signature with its thumbnail digital signature in a database.

3. The method of claim 2, wherein the digital signature is stored with its thumbnail digital signature in the database conditional on there being no match between it and any digital signature already stored in the database.

4. The method of claim 2, further comprising:
  labelling the article with a machine-readable marking that encodes an approximate record locator to assist finding the digital signature in the database.

5. The method of claim 1, further comprising:
  providing a database of previously recorded signatures and their thumbnail digital signatures;
  searching the database to seek at least one candidate match by performing a comparison between the determined thumbnail digital signature and the previously recorded thumbnail digital signatures; and
  determining for any candidate match whether there is a match by performing a comparison between the determined digital signature and the at least one previously recorded digital signatures.

6. The method of claim 4, further comprising:
  determining for each match a confidence level based on degree of similarity between the determined digital signature and the previously recorded digital signature found to have a match.

7. The method of claim 5, further comprising:
  labelling the article with a machine-readable marking that encodes an approximate record locator to assist finding the digital signature in the database; and
  reading the machine-readable marking on the article to obtain the approximate record locator, and using the approximate record locator to seek the at least one candidate match in the database.

8. The method of claim 1, wherein the article is made of paper or cardboard.

9. An apparatus for scanning an article arranged in a reading volume, comprising:
  a source for generating a coherent beam;
  a detector arrangement for collecting a set of data points from signals obtained when the coherent beam scatters from the reading volume, the set of data points comprising at least one data point relating to scatter from a first part of the reading volume and at least one data point relating to scatter from a second part of the reading volume; and a data acquisition and processing module operable to: (i) determine a digital signature of the article by digitising the set of data points; and (ii) determine a thumbnail digital signature of the article by digitising an amplitude part of a Fourier transform of the set of data points.

10. The apparatus of claim 9, wherein the data acquisition and processing module is further operable to:

store the digital signature with its thumbnail digital signature in a database.

11. The apparatus of claim 10, wherein the data acquisition and processing module is operable to store the digital signature with its thumbnail digital signature in the database conditional on there being no match between it and any digital signature already stored in the database.

12. The apparatus of claim 9, further comprising:

a database of previously recorded signatures and their thumbnail digital signatures; and a search tool operable to (i) search the database to seek at least one candidate match by performing a comparison between the determined thumbnail digital signature and the previously recorded thumbnail digital signatures; and (ii) determine for any candidate match whether there is a match by performing a comparison between the determined digital signature and the at least one previously recorded digital signatures.

13. The apparatus of claim 12, wherein the search tool is further operable to determine for each match a confidence level based on degree of similarity between the determined digital signature and the previously recorded digital signature found to have a match.

14. A system comprising:

a database comprising a plurality of records, wherein each record includes (i) a digital signature of an article obtained by digitising a set of data points obtained from the article, the set of data points comprising at least one data point relating to scatter from a first point of the article and at least one data point relating to scatter from a second point of the article and (ii) a thumbnail digital signature of the article obtained by digitising an amplitude part of a Fourier transform of the set of data points; and a search tool operable to search the database for candidate matches by performing a comparison between an input thumbnail digital signature and the thumbnail digital signatures in the database.

15. The system of claim 14, wherein the data points are obtained from scattering of coherent light from the article.

16. The system of claim 14, wherein the search tool is further operable to:

determine for any candidate match whether there is a match by performing a comparison between the input digital signature and the digital signature held in the record of the candidate match.

17. The system of claim 14, wherein the search tool is operable to search the database for candidate matches using an approximate record locator.

18. The system of claim 14, wherein the database is remote from the search tool.

19. The system of claim 14, wherein the database is integral with the search tool.

20. The method of claim 1, wherein the different parts of the reading volume are subjected to coherent light sequentially.

21. The apparatus of claim 9, wherein the different parts of the reading volume are subjected to coherent light sequentially.

* * * * *